US012604315B2

(12) United States Patent
Matsumura et al.

(10) Patent No.: US 12,604,315 B2
(45) Date of Patent: Apr. 14, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 314 days.

(21) Appl. No.: 18/283,415

(22) PCT Filed: Mar. 24, 2021

(86) PCT No.: PCT/JP2021/012171
§ 371 (c)(1),
(2) Date: Sep. 21, 2023

(87) PCT Pub. No.: WO2022/201349
PCT Pub. Date: Sep. 29, 2022

(65) Prior Publication Data
US 2024/0172230 A1     May 23, 2024

(51) Int. Cl.
*H04W 72/1273*       (2023.01)
*H04L 5/00*          (2006.01)
*H04L 27/26*         (2006.01)
*H04W 56/00*         (2009.01)

(52) U.S. Cl.
CPC ....... *H04W 72/1273* (2013.01); *H04L 5/0051* (2013.01); *H04L 27/26025* (2021.01); *H04W 56/0015* (2013.01)

(58) Field of Classification Search
CPC .......... H04W 72/1273; H04W 56/0015; H04L 27/26025; H04L 5/0051
See application file for complete search history.

(56) References Cited

U.S. PATENT DOCUMENTS

| | | | | |
|---|---|---|---|---|
| 2020/0351129 A1* | 11/2020 | Kwak | ................... | H04W 76/27 |
| 2022/0085939 A1* | 3/2022 | Mondal | ................. | H04L 5/0048 |

FOREIGN PATENT DOCUMENTS

| | | | | |
|---|---|---|---|---|
| WO | WO-2021062973 A1 * | 4/2021 | ........... | H04L 5/0053 |

OTHER PUBLICATIONS

International Search Report issued in PCT/JP2021/012171 on Nov. 2, 2021 (3 pages).
Written Opinion of the International Searching Authority issued in PCT/JP2021/012171 on Nov. 2, 2021 (4 pages).
Apple Inc.; "Remaining issues on Rel-16 Multi-TRP enhancement"; 3GPP TSG RAN WG1 #104-e, R1-2101349; e-Meeting; Jan. 25-Feb. 5, 2021 (7 pages).

(Continued)

*Primary Examiner* — Samina F Choudhry
(74) *Attorney, Agent, or Firm* — Osha Bergman Watanabe & Burton LLP

(57) ABSTRACT
A terminal according to one aspect of the present disclosure includes: a control section that judges allocation of a downlink shared channel or a reference signal for the downlink shared channel, based on at least one of a cell index, a control resource set pool index, and a group index configured for a control resource set to which each of the synchronization signal block and the downlink shared channel corresponds; and a reception section that receives at least one of the synchronization signal block and the downlink shared channel.

4 Claims, 13 Drawing Sheets

(56) References Cited

OTHER PUBLICATIONS

Ericsson; "Enhancement on Multi-TRP inter-cell operation"; 3GPP TSG-RAN WG1 Meeting #104-e, Tdoc R1-2101144; e-Meeting; Jan. 25-Feb. 6, 2021 (6 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the known Rel-15/16 NR specifications, restrictions (which may be referred to as priority rules) are defined to ensure, in a case where a plurality of channels/signals collide, that the plurality of channels/signals correspond to the same quasi-co-location (QCL) type D or to avoid such a case.

In future radio communication systems (for example, a radio communication system later than Rel. 16/5G), a case where a plurality of channels/signals collide in mobility (inter-cell mobility) between a plurality of cells including a non-serving cell or inter-cell mobility using a plurality of transmission/reception points (for example, multi-TRP (MTRP)) is also assumed.

In such a case, how to control a condition applied to the plurality of channels/signals in inter-cell mobility (for example, Single-TRP inter-cell mobility)/multi-TRP inter-cell mobility (for example, Multi-TRP inter-cell mobility) is a problem. When transmission/reception of channels/signals transmitted from the same cell/TRP or respective different cells/TRPs is not appropriately performed, throughput may decrease, or communication quality may degrade.

Thus, an object of the present disclosure is to provide a terminal, a radio communication method, and a base station that can appropriately control reception or transmission of channels/signals transmitted from the same cell/TRP or respective different cells/TRPs.

Solution to Problem

A terminal according to one aspect of the present disclosure includes: a control section that judges allocation of a downlink shared channel or a reference signal for the downlink shared channel, based on at least one of a cell index, a control resource set pool index, and a group index configured for a control resource set to which each of the synchronization signal block and the downlink shared channel corresponds; and a reception section that receives at least one of the synchronization signal block and the downlink shared channel.

Advantageous Effects of Invention

According to one aspect of the present disclosure, it is possible to appropriately control reception or transmission of channels/signals transmitted from the same cell/TRP or respective different cells/TRPs.

Figure 1A:
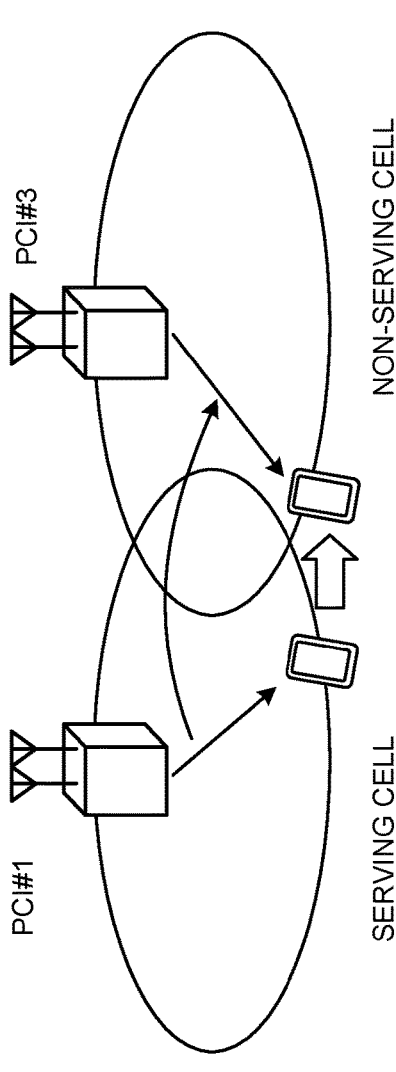
FIGS. 1A and 1B are diagrams to show examples of inter-cell mobility.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information regarding quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information regarding QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that a channel/signal being a target of application of a TCI state may be referred to as a target channel/reference signal (RS) or simply as a target, and another signal described above may be referred to as a reference reference signal (reference RS) and a source RS or simply as a reference.

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a demodulation reference signal (DMRS), and the like.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

(Collision of Plurality of Channels/Signals)

In the known Rel-15/16 NR specifications, a UE can receive, detect, or monitor only channels/signals of the same QCL type D in the same time, but it is not supported that the UE receives, detects, or monitors a plurality of channels/signals of different types of QCL type D in the same time. Hence, in the known Rel-15/16 NR specifications, restrictions (which may be referred to as priority rules, QCL application rules, and the like) as those to be described below are defined to ensure, in a case where a plurality of channels/signals collide (in other words, are transmitted/received in an overlapping time), that the plurality of channels/signals correspond to the same QCL type D or to avoid such a case.

Note that, in the present disclosure, (a reference RS of) QCL type D of a certain channel/signal and (a reference RS of) QCL type D of another channel/signal being different from each other may mean a beam used for communication of the certain channel/signal and a beam used for communication of the other channel/signal being different from each other. In the present disclosure, (a reference RS) of QCL type D of a certain channel/signal and (a reference RS) of QCL type D of another channel/signal being different from each other may be expressed as types of QCL type D of the certain channel/signal and the other channel/signal being different from each other, QCL type D characteristics of these channels/signals being different from each other, being different in "QCL type D," and the like.

<SSB vs. CSI-RS>

When a CSI-RS resource is configured in the same OFDM symbol as that of an SS/PBCH block, a UE may expect that the CSI-RS and the SS/PBCH block are in a QCL relationship (quasi co-located) when QCL type D is applied. Moreover, the UE may expect that the same subcarrier spacing (SCS) is applied to both the CSI-RS and the SS/PBCH block without expecting the CSI-RS being configured in a PRB overlapping the resource block (for example, the PRB) of the SS/PBCH block.

<SSB vs. PDSCH>

When a reference signal (for example, a DMRS) for a PDSCH and an SS/PBCH block are received in the same symbol, the UE may expect that the DMRS and the SS/PBCH block are in a QCL relationship with "QCL type D" (quasi co-located with QCL-TypeD) when QCL type D is applied.

Moreover, the UE may expect that the same or different subcarrier spacings are configured for a DMRS and an SS/PBCH block in a CC (or a cell) except for a case of 240 kHz where only different subcarrier spacings are supported, without expecting that a DMRS is received in a resource element overlapping the resource element of the SS/PBCH block.

For example, when the UE receives a PDSCH scheduled with an SI-RNTI and system information indicator of DCI is configured at 0, the UE may assume that the SS/PBCH block is not transmitted in a resource element used for the reception of the PDSCH.

When the UE receives a PDSCH scheduled with an SI-RNTI, the system information indicator of DCI is configured at 1, or a PDSCH scheduled with an RA-RNTI, an MSGB-RNTI, a P-RNTI, or a TC-RNTI is received, the UE may assume transmission of an SS/PBCH block according to a higher layer parameter (for example, ssb-PositionsIn-Burst). When allocation of a PDSCH resource overlaps the PRB including the resource for SS/PBCH block transmission, the UE may assume that the PRB including the SS/PBCH block transmission resource is not available for the PDSCH in the OFDM symbol in which the SS/PBCH block is transmitted.

When a PDSCH scheduled by a PDCCH CRC-scrambled with a C-RNTI, an MCS-C-RNTI, or a CS-RNTI, or an SPS PDSCH is received, a resource element corresponding to a resource configured under a given condition or specified dynamically is not available for the PDSCH. When the PRB including the SS/PBCH block transmission resource and the PDSCH resource allocation overlap, the UE may assume that the PRB including the SS/PBCH block transmission resource is not available for the PDSCh in the OFDM symbol in which the SS/PBCH block is transmitted and may assume transmission of the SS/PBCH block according to a higher layer parameter (for example, ssb-PositionsInBurst).

<PDCCH vs. CSI-RS>

For a CSI-RS resource related to a non-zero power (Non Zero Power (NZP))-CSI-RS resource set with a higher layer parameter (for example, 'repetition') related to repetition being on, the UE may not assume that a CSI-RS is configured configured in a symbol while the UE is configured to monitor a CORESET. In other words, the CORESET and the CSI-RS resource in this case may not overlap in terms of time.

In contrast, for another NZP-CSI-RS resource set configuration (for example, with 'repetition' not being on), when a CSI-RS resource and a search space set related to a CORESET are configured in the same OFDM symbol, the UE may expect, when QCL type D is applied, that DMRSs of PDCCHs transmitted in all the search space sets associated with the CSI-RS and the CORESET are in a QCL relationship with "QCL type D." This may also be applied, when QCL type D is applied, to a case where the CSI-RS and the CORESET are in CCs in different bands (for example, different intra-band component carriers).

Moreover, the UE may not expect that the CSI-RS is configured in a PRB overlapping the PRB of the CORESET in the OFDM symbol occupied by the search space set.

(Inter-Cell Mobility)

For NR, it is studied that one or a plurality of transmission/reception points (TRPs) (multi-TRP (MTRP)) perform DL transmission to a UE. It is also studied that the UE performs UL transmission to the one or plurality of TRPs.

Figure 1B:
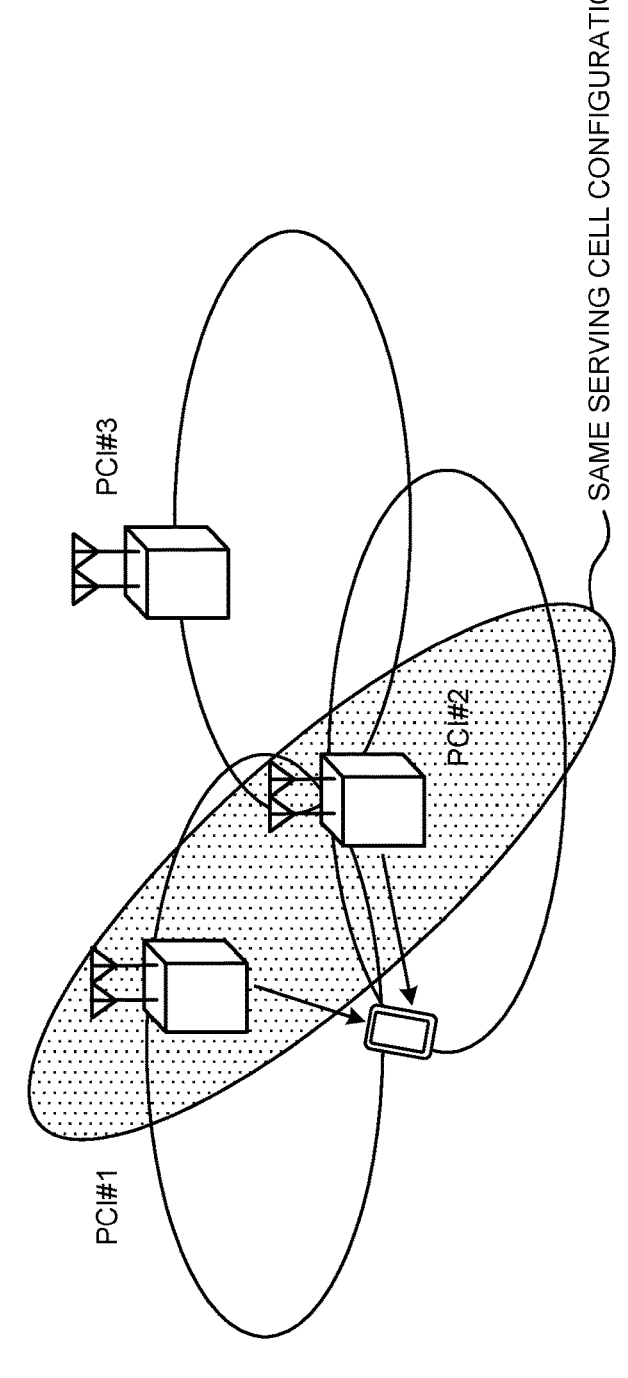

It is considered that the UE receives channels/signals from a plurality of cells/TRPs in inter-cell mobility (for example, L1/L2 inter cell mobility) (see FIGS. 1A and 1B).

FIG. 1A shows an example of inter-cell mobility including a non-serving cell (for example, Single-TRP inter-cell mobility). Here, shown is a case where the UE receives channels/signals from the base station/TRP of cell #1 being a serving cell and the base station/TRP of cell #3 not being a serving cell (non-serving cell). For example, this corresponds to a case where the UE switches (for example, fast cell switch) from cell #1 to cell #3.

In this case, a TCI state may be updated by DCI/MAC CE, and a port (for example, an antenna port)/TRP may be dynamically selected. Different physical cell IDs (for example, PCIs) are configured for cell #1 and cell #3.

FIG. 1B shows an example of multi-TRP scenario (for example, inter-cell mobility in a case of using multi-TRP (Multi-TRP inter-cell mobility)). Here, shown is a case where the UE receives channels/signals from TRP #1 and TRP 2. Here, shown is a case where TRP #1 is present in cell #1 (PCI #1) and TRP #2 is present in cell #2 (PCI #2).

The multi-TRP (TRPs #1 and #2) may be connected via ideal/non-ideal backhaul to exchange information, data, and the like. Each TRP of the multi-TRP may transmit a different codeword (Code Word (CW)) and a different layer. As one mode of the multi-TRP transmission, non-coherent joint transmission (NCJT) may be used as shown in FIG. 1B. Here, shown is a case where NCJT is performed among a plurality of cells (for example, cells of different PCIs). Note that the same serving cell configuration may be applied to/configured for TRP #1 and TRP #2.

In NCJT, for example, TRP #1 performs modulation mapping on a first codeword, performs layer mapping, and transmits a first signal/channel (for example, PDSCH) in layers of a first number (for example, two layers) by using first precoding. TRP #2 performs modulation mapping on a second codeword, performs layer mapping, and transmits a second signal/channel (for example, PDSCH) in layers of a second number (for example, two layers) by using second precoding.

A plurality of PDSCHs (multi-PDSCH) transmitted by NCJT may be defined to partially or entirely overlap in terms of at least one of the time and frequency domains. In other words, the first PDSCH from TRP #1 and the second PDSCH from TRP #2 may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a certain QCL type (for example, QCL type D).

A plurality of PDSCHs (which may be referred to as multi-PDSCH (multiple PDSCHs)) from the multi-TRP may be scheduled by using one piece of DCI (single DCI (S-DCI), single PDCCH) (single master mode). One piece of DCI may be transmitted from one TRP of the multi-TRP. A configuration using one piece of DCI in the multi-TRP may be referred to as single-DCI based multi-TRP (mTRP/MTRP).

The plurality of PDSCHs from the multi-TRP may be separately scheduled by using a plurality of pieces of DCI (multi-DCI (M-DCI), multi-PDCCH (multiple PDCCHs)) (multi-master mode). A plurality of respective pieces of DCI may be transmitted from the multi-TRP. A configuration using a plurality of pieces of DCI in the multi-TRP may be referred to as multi-DCI based multi-TRP (mTRP/MTRP).

The UE may assume to transmit separate CSI reports related to the respective TRPs, to different TRPs. Such CSI feedback may be referred to as separate feedback, separate CSI feedback, and the like. In the present disclosure, "separate" may be interpreted as "independent" and vice versa.

It is a problem how to control transmission or reception of channels/signals transmitted from the same cell/TRP or different cells/TRPs in at least one of inter-cell mobility including a non-serving cell and a multi-TRP scenario as described above. When transmission/reception of channels/signals transmitted from the same cell/TRP or respective different cells/TRPs is not appropriately performed, throughput may decrease, or communication quality may degrade.

Thus, the inventors of the present invention came up with the idea of control for appropriately performing transmission or reception of a plurality of channels/signals.

Embodiments according to the present disclosure will be described in detail with reference to the drawings as follows. The aspects may each be employed individually, or may be employed in combination.

Note that in the present disclosure, "A/B" may mean "at least one of A and B."

In the present disclosure, activate, deactivate, indicate, select, configure, update, determine, and the like may be interchangeably interpreted.

In the present disclosure, RRC, an RRC parameter, an RRC message, a higher layer parameter, an information element (IE), and a configuration may be interchangeably interpreted. In the present disclosure, a MAC CE, an update command, and an activation/deactivation command may be interchangeably interpreted. In the present disclosure, "support," "control," "can/may control," "operate," and "can/may operate" may be interchangeably interpreted.

In the present disclosure, a sequence, a list, a set, a group, and the like may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, a given antenna port (for example, a demodulation reference signal (DMRS) port), a given antenna port group (for example, a DMRS port group), a given group (for example, a code division multiplexing (CDM) group, a given reference signal group, or a CORESET group), a given resource (for example, a given reference signal resource), a given resource set (for example, a given reference signal resource set), a CORESET pool, a PUCCH group (PUCCH resource group), a spatial relation group, a downlink TCI state (DL TCI state), an uplink TCI state (UL TCI state), a unified TCI state, and the like may be interchangeably interpreted.

The Panel may be related to at least one of a group index of an SSB/CSI-RS group, a group index of group-based beam report, and a group index of an SSB/CSI-RS group for group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

In the present disclosure, the UE configured with a plurality of TRPs may judge at least one of a TRP corresponding to DCI, a TRP corresponding to a PDSCH or UL transmission (such as a PUCCH, a PUSCH, or an SRS) scheduled by the DCI, and the like, based on at least one of the following.

Value of a given field (for example, a field specifying a TRP, an antenna port field, or a PRI) included in the DCI.

DMRS (for example, a sequence, a resource, a CDM group, a DMRS port, a DMRS port group, an antenna port group, or the like of the DMRS) corresponding to a scheduled PDSCH/PUSCH.

DMRS (for example, a sequence, a resource, a CDM group, a DMRS port, a DMRS port group, or the like of the DMRS) corresponding to a PDCCH in which the DCI is transmitted.

CORESET (for example, a CORESET pool ID of the CORESET, an ID, a scramble ID (which may be interpreted as a sequence ID), or a resource of the CORESET, or the like) in which the DCI is received.

RS (RS related group or the like) used for TCI state, QCL assumption, spatial relation information, and the like.

In the present disclosure, a single PDCCH (DCI) may be referred to as a PDCCH (DCI) of a first scheduling type (for example, scheduling type A (or type 1)). Multi-PDCCH (DCI) may be referred to as a PDCCH (DCI) of a second scheduling type (for example, scheduling type B (or type 2)).

In the present disclosure, for single DCI, the i-th TRP (TRP #i) may mean the i-th TCI state, the i-th CDM group, or the like (i is an integer). For multi-DCI, the i-th TRP (TRP #i) may mean a CORESET corresponding to CORESET pool index=i, the i-th TCI state, the i-th CDM group, or the like (i is an integer).

In the present disclosure, it may be assumed that a single PDCCH is supported when multi-TRP uses ideal backhaul. It may be assumed that multi-PDCCH is supported when multi-TRP uses non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. Terms are not limited to these.

In the present disclosure, multi-TRP, multi-TRP system, multi-TRP transmission, and multi-PDSCH may be interchangeably interpreted.

In the present disclosure, single DCI (sDCI), a single PDCCH, a multi-TRP system based on single DCI, sDCI-based MTRP, and two TCI states in at least one TCI codepoint being activated may be interchangeably interpreted.

In the present disclosure, multi-DCI (mDCI), multi-PDCCH, a multi-TRP system based on multi-DCI, mDCI-based MTRP, and two CORESET pool indices or CORESET pool index=1 (or a value equal to one or greater) being configured may be interchangeably interpreted.

QCL in the present disclosure may be interchangeably interpreted as QCL type D.

Note that the following embodiments will be described by assuming that a UE is applied in a case of supporting simultaneous reception of channels/signals of two or more different types of QCL type D but may be applied to other cases.

In each of the following aspects, a case where the UE receives a first signal (or channel/reference signal) transmitted from a serving cell and a second signal (or channel/reference signal) transmitted from a non-serving cell or a case where the UE receives a first signal and a second signal transmitted from a plurality of TRPs in a serving cell are given as examples, but these are not restrictive. In addition to these, each of the aspects may be applied to a case where transmission is performed by TRPs (or MTRP) in a non-serving cell.

(First Aspect)

In a first aspect, control of transmission of a synchronization signal block (SSB) and a channel state information reference signal (CSI-RS) will be described.

Collision handling for an SSB and a CSI-RS in the same time domain may be controlled based on a cell/TRP from which the SSB/CSI-RS is transmitted. Note that handling of resource collision between the SSB and the CSI-RS (for example, resource allocation) may be interpreted as rate matching.

UE operations in a case of inter-cell mobility including a non-serving cell (L1/L2 inter-cell mobility) (case 1-1), a multi-DCI based MTRP scenario (case 1-2), and single-DCI based MTRP scenario (case 1-3) will be described below. In the following description, an SSB and a CSI-RS overlapping in the same time domain (or at least part of the time domain) are assumed, but this is not restrictive.

<Case 1-1>

It may be allowed/supported that a TCI state is configured for a resource RS (for example, an SSB) from a non-serving cell (or a serving cell with a different PCI). In this case, it may be supported that association between the CSI-RS and the non-serving cell (or the SSB from the non-serving cell) is configured. The association between the CSI-RS and the non-serving cell (or the SSB from the non-serving cell) may be performed directly or may be performed indirectly (undirectly).

The association being performed directly may mean, for example, that an indication (for example, a PCI or a PCI flag) of the serving cell or the non-serving cell is configured for the SSB/CSI-RS or the TCI state corresponding to the SSB/CSI-RS.

The association being performed indirectly may mean, for example, that the SSB/CSI-RS is associated with the serving cell when a QCL source RS (for example, a type D RS) of the TCI state for the SSB/CSI-RS is in the serving cell (or configured in the serving cell). In other cases, this may mean that the SSB/CSI-RS is associated with the non-serving cell.

Figures 2A, 2B:
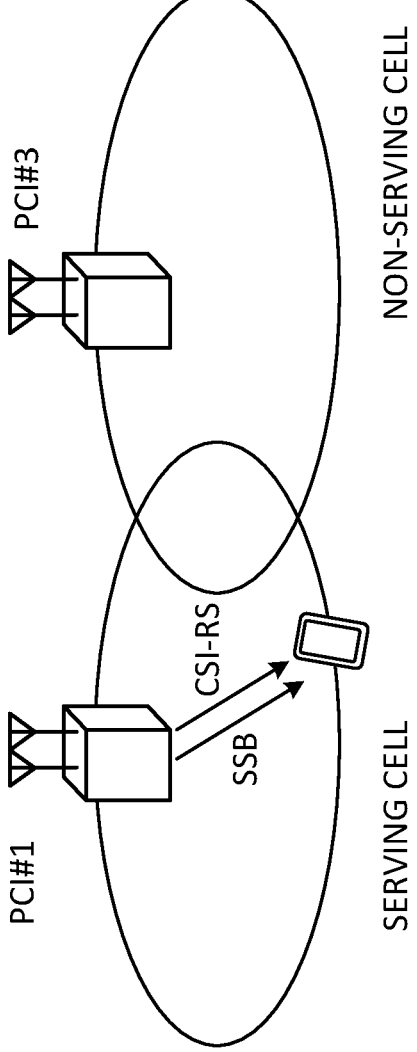
FIGS. 2A and 2B are diagrams to show examples of a case of receiving an SSB and a CSI-RS according to a first aspect.

FIG. 2A shows an example of a case where an SSB and a CSI-RS are transmitted from the same cell. When the SSB and the CSI-RS are transmitted from the same cell, the UE may not expect that the CSI-RS is configured in a PRB overlapping the resource block (for example, the PRB) of the SSB (Condition 1-1-1). Moreover, when the SSB and the CSI-RS are transmitted from the same cell, the UE may expect that the same subcarrier spacing is applied to both the CSI-RS and the SSB (Condition 1-1-2). In the present disclosure, expectation and assumption may be interchangeably interpreted.

The same cell may mean between a serving cell and a serving cell or a between a non-serving cell and a non-serving cell. Condition 1-1-1 may be interpreted as a condition for allocation of the SSB and the CSI-RS. Condition 1-1-1 may be interpreted that the UE may expect that the CSI-RS is not configured for the PRB overlapping the PRB of the SSB. Condition 1-1-2 may be interpreted as a condition for subcarrier spacing applied to the SSB and the CSI-RS. Interpretation may similarly be applied to other conditions. In the present disclosure, Condition X may be interpreted as Restriction X.

FIG. 2B shows an example of a case where an SSB and a CSI-RS are transmitted from different cells. Here, shown is a case where the SSB is transmitted from a serving cell and the CSI-RS is transmitted from a non-serving cell. However, an SSB may be transmitted from the non-serving cell, and a CSI-RS may be transmitted from the serving cell.

When the SSB and the CSI-RS are transmitted from different cells (for example, one is the serving cell, and the other is the non-serving cell), the UE may apply at least one of Option 1-1-1 to Option 1-1-5 below.

{Option 1-1-1}

Condition 1-1-1 and Condition 1-1-2 may not be applied to an SSB and a CSI-RS transmitted from different cells. For example, it may be allowed/supported that, for the SSB and the CSI-RS transmitted from the different cells, the CSI-RS is configured for a PRB overlapping the PRB of the SSB. It may be allowed/supported that different subcarrier spacings are applied to/configured for the SSB and the CSI-RS transmitted from the different cells.

{Option 1-1-2}

Condition 1-1-1 and Condition 1-1-2 may be applied to an SSB and a CSI-RS transmitted from different cells. For example, the UE may not expect that, also for an SSB and a CSI-RS transmitted from different cells, the CSI-RS is configured for a PRB overlapping the PRB of the SSB. The UE may expect that the same subcarrier spacing is applied to/configured for the SSB and the CSI-RS transmitted from the different cells.

{Option 1-1-3}

For an SSB and a CSI-RS transmitted from different cells, only one of the conditions may be applied (for example, Condition 1-1-1 is not applied, and Condition 1-1-2 is applied). For example, it may be allowed/supported that, for the SSB and the CSI-RS transmitted from the different cells, the CSI-RS is configured for a PRB overlapping the PRB of the SSB. Meanwhile, the UE may expect that the same subcarrier spacing is applied to/configured for the SSB and the CSI-RS transmitted from the different cells.

{Option 1-1-4}

Application of Condition 1-1-1/1-1-2 may be controlled based on types of cells (for example, PCIs) from which an SSB and a CSI-RS are transmitted. For example, when the SSB is transmitted from a serving cell and the CSI-RS is transmitted from a non-serving cell, condition 1-1-1/1-1-2 may be applied. In contrast, when the SSB is transmitted from a non-serving cell and the CSI-RS is transmitted from a serving cell, Condition 1-1-1/1-1-2 may not be applied.

{Option 1-1-5}

When an SSB is transmitted from a non-serving cell and a CSI-RS is transmitted from a serving cell, condition 1-1-1/1-1-2 may be applied. In contrast, when the SSB is transmitted from a serving cell and a CSI-RS is transmitted from a non-serving cell, Condition 1-1-1/1-1-2 may not be applied.

In this way, by applying at least one of Option 1-1-1 to Option 1-1-5, the UE can appropriately perform, by judging resource allocation (for example, rate matching) and sub-carrier spacing to be applied, reception processing, even when an SSB and a CSI-RS are transmitted from different cells.

<Case 1-2>

When a CORESET pool index is configured for a control resource set (CORESET) in multi-DCI based MTRP (or mTRP), configuration of association between the SSB/CSI-RS and the CORESET pool index may be supported. The association between the SSB/CSI-RS and the CORESET pool index may be performed directly or may be performed indirectly (un-directly).

Figure 3A:
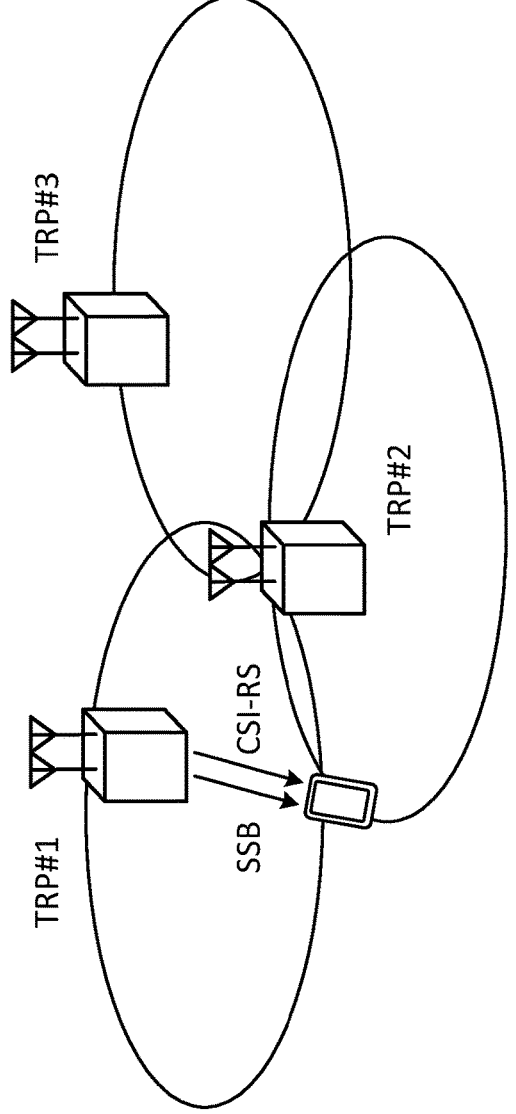
FIGS. 3A and 3B are diagrams to show other examples of the case of receiving an SSB and a CSI-RS according to the first aspect.

FIG. 3A shows an example of a case where an SSB and a CSI-RS are associated with the same CORESET pool index (for example, transmitted from the same TRP). Here, shown is a case where the SSB and the CSI-RS are transmitted from TRP #1.

For an SSB/CSI-RS associated with a certain CORESET pool index (for example, the same CORESET pool index), the UE may not expect that the CSI-RS is configured for a PRB overlapping the PRB of the SSB (Condition 1-2-1). The UE may expect that the same subcarrier spacing is applied to both the CSI-RS and the SSB (Condition 1-2-2).

Figure 3B:
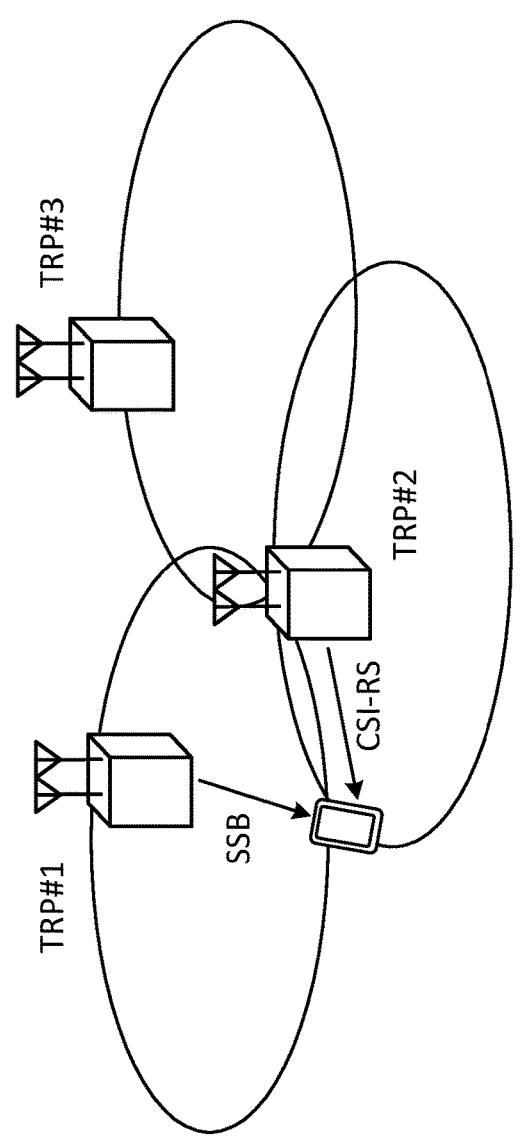

FIG. 3B shows an example of a case where an SSB and a CSI-RS are associated with different CORESET pool indices (for example, transmitted from different TRPs). Here, shown is a case where the SSB is transmitted from TRP #1 (for example, corresponding to CORESET pool index 0), and the CSI-RS is transmitted from TRP #2 (for example, corresponding to CORESET pool index 1).

The UE may apply at least one of Option 1-2-1 to Option 1-2-5 below to the SSB and the CSI-RS associated with different CORESET pool indices.

{Option 1-2-1}

Condition 1-2-1 and Condition 1-2-2 may not be applied to an SSB and a CSI-RS corresponding to different CORE-SET pool indices. For example, it may be allowed/supported that, for the SSB and the CSI-RS corresponding to different CORESET pool indices, the CSI-RS is configured for a PRB overlapping the PRB of the SSB. It may be allowed/supported that different subcarrier spacings are applied to/configured for the SSB and the CSI-RS corresponding to the different CORESET pool indices.

{Option 1-2-2}

Condition 1-2-1 and Condition 1-2-2 may be applied to an SSB and a CSI-RS corresponding to different CORESET pool indices. For example, the UE may not expect that, also for the SSB and the CSI-RS corresponding to different CORESET pool indices, the CSI-RS is configured for a PRB overlapping the PRB of the SSB. The UE may expect that the same subcarrier spacing is applied to/configured for the SSB and the CSI-RS corresponding to the different CORE-SET pool indices.

{Option 1-2-3}

For an SSB and a CSI-RS corresponding to different CORESET pool indices, only one of the conditions may be applied (for example, Condition 1-2-1 is not applied, and Condition 1-2-2 is applied). For example, it may be allowed/supported that, for the SSB and the CSI-RS corresponding to different CORESET pool indices, the CSI-RS is config-ured for a PRB overlapping the PRB of the SSB. Meanwhile, the UE may expect that the same subcarrier spacing is applied to/configured for the SSB and the CSI-RS corre-sponding to the different CORESET pool indices.

{Option 1-2-4}

Application of Condition 1-2-1/1-2-2 may be controlled based on the CORESET pool indices to which an SSB and a CSI-RS correspond. For example, Condition 1-2-1/1-2-2 may be applied when the SSB corresponds to CORESET pool index 0 and the CSI-RS corresponds to CORESET pool index 1. In contrast, Condition 1-2-1/1-2-2 may not be applied when the SSB corresponds to CORESET pool index 1 and the CSI-RS corresponds to CORESET pool index 0.

{Option 1-2-5}

Condition 1-2-1/1-2-2 may be applied when an SSB corresponds to CORESET pool index 1 and a CSI-RS corresponds to CORESET pool index 0. In contrast, Con-dition 1-2-1/1-2-2 may not be applied when an SSB corre-sponds to CORESET pool index 0 and a CSI-RS corre-sponds to CORESET pool index 1.

In this way, by applying at least one of Option 1-2-1 to Option 1-2-5, the UE can appropriately perform, by judging resource allocation (for example, rate matching) and sub-carrier spacing to be applied, reception processing, even when an SSB and a CSI-RS are transmitted from different TRPs.

<Case 1-3>

In single-DCI based MTRP, the UE may apply at least one of Alt. 1-3-1 and Alt. 1-3-2 below.

<<Alt. 1-3-1>>

In single-DCI based MTRP, a new group index for a CORESET or a new group index for a channel measurement resource (CMR) configuration in a CSI framework may be supported. In this case, a configuration of association between an SSB/CSI-RS and the new group index may be supported. The association between the SSB/CSI-RS and the new group index may be performed directly or may be performed indirectly (un-directly).

The new group index may indicate a relationship between a plurality of reference signals/channels and indicate whether rate matching (or collision handling) between the plurality of reference signals/channels is applicable.

For example, for an SSB and a CSI-RS associated with the same group, the UE may not expect that the CSI-RS is configured for a PRB overlapping the PRB of the SSB (Condition 1-3-1). Moreover, for the SSB and the CSI-RS associated with the same group, the UE may expect that the same subcarrier spacing is applied to both the CSI-RS and the SSB (Condition 1-3-2).

The UE may apply at least one of Option 1-3-1 to Option 1-3-5 below to the SSB and the CSI-RS associated with different group indices.

{Option 1-3-1}

Condition 1-3-1 and Condition 1-3-2 may not be applied to an SSB and a CSI-RS corresponding to different group indices. For example, it may be allowed/supported that, for the SSB and the CSI-RS corresponding to different group indices, the CSI-RS is configured for a PRB overlapping the PRB of the SSB. It may be allowed/supported that different subcarrier spacings are applied to/configured for the SSB and the CSI-RS corresponding to the different group indices.

{Option 1-3-2}

Condition 1-3-1 and Condition 1-3-2 may be applied to an SSB and a CSI-RS corresponding to different group indices. For example, the UE may not expect that, also for the SSB and the CSI-RS corresponding to different group indices, the CSI-RS is configured for a PRB overlapping the PRB of the SSB. The UE may expect that the same subcarrier spacing is applied to/configured for the SSB and the CSI-RS corre-sponding to the different group indices.

{Option 1-3-3}

For an SSB and a CSI-RS corresponding to different group indices, only one of the conditions may be applied (for example, Condition 1-3-1 is not applied, and Condition 1-3-2 is applied). For example, it may be allowed/supported that, for the SSB and the CSI-RS corresponding to different group indices, the CSI-RS is configured for a PRB overlapping the PRB of the SSB. Meanwhile, the UE may expect that the same subcarrier spacing is applied to/configured for the SSB and the CSI-RS corresponding to the different group indices.

{Option 1-3-4}

Application of Condition 1-3-1/1-3-2 may be controlled based on the group indices to which an SSB and a CSI-RS correspond. For example, Condition 1-3-1/1-3-2 may be applied when the SSB corresponds to group index 0 and the CSI-RS corresponds to group index 1. In contrast, Condition 1-3-1/1-3-2 may not be applied when the SSB corresponds to group index 1 and the CSI-RS corresponds to group index 0.

{Option 1-3-5}

Condition 1-3-1/1-3-2 may be applied when the SSB corresponds to group index 0 and the CSI-RS corresponds to group index 1. In contrast, Condition 1-3-1/1-3-2 may not be applied when the SSB corresponds to group index 1 and the CSI-RS corresponds to group index 0.

<<Alt. 1-3-2>>

Assume a case where two TCI states are applied to one PDSCH. For example, two TIC states may be configured for/applied to one PDSCH, based on activation of a TCI state by a MAC CE (+TCI state indication by DCI) or a default QCL rule.

When two TCI states are activated for a certain codepoint of a TCI field in DCI for scheduling a PDSCH by a MAC CE, this may indicate that the two TCI states correspond to different TRPs. In this case, a case where an SSB and a CSI-RS colliding (or overlapping) in the time domain are associated with the two respective TCI states and are transmitted from different TRPs is also assumed.

In this case, the UE may apply at least one of Option 1-3-1 to Option 1-3-5 above to the SSB and the CSI-RS associated with different TCI states of the two TCI states. For example, note that group indices need only be interpreted as TCI state indices in Option 1-3-1 to Option 1-3-5.

In this way, by applying at least one of Option 1-3-1 to Option 1-3-5, the UE can appropriately perform, by judging resource allocation (for example, rate matching) and subcarrier spacing to be applied, reception processing, even when an SSB and a CSI-RS are transmitted from different TRPs.

As described in the first aspect, in a case where an SSB and a CSI-RS are transmitted from different cells/TRPs, processing can be simplified when the same condition as an allocation condition (for example, rate matching processing)/a subcarrier spacing condition applied in a case where an SSB and a CSI-RS are transmitted from the same cell is applied. Alternatively, in a case where an SSB and a CSI-RS are transmitted from different cells/TRPs, transmission of the SSB and the CSI-RS can be flexibly controlled by allowing application of a condition at least partially different from an allocation condition (for example, rate matching processing)/a subcarrier spacing condition applied in a case where an SSB and a CSI-RS are transmitted from the same cell is applied.

(Second Aspect)

In a second aspect, control of transmission of a synchronization signal block (SSB) and a downlink shared channel (PDSCH) will be described.

Collision handling for the SSB and the PDSCH in the same time domain may be controlled based on a cell/TRP from which the SSB/PDSCH is transmitted. Note that handling of resource collision between the SSB and the PDSCH may be interpreted as rate matching.

UE operations in a case of inter-cell mobility including a non-serving cell (L1/L2 inter-cell mobility) (case 2-1), a multi-DCI based MTRP scenario (case 2-2), and single-DCI based MTRP scenario (case 2-3) will be described below. In the following description, an SSB and a PDSCH overlapping in the same time domain (or at least part of the time domain) are assumed, but this is not restrictive.

<Case 2-1>

It may be allowed/supported that a TCI state is configured for a resource RS (for example, an SSB) from a non-serving cell (or a serving cell with a different PCI).

Figure 4A:
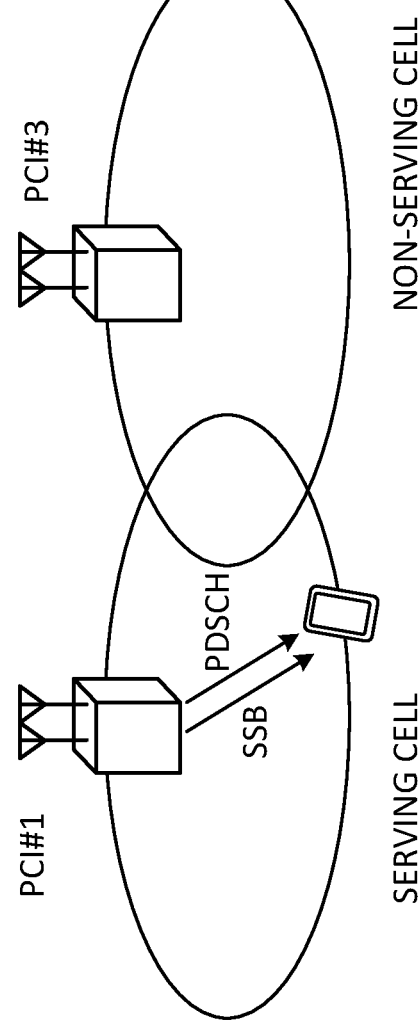
FIGS. 4A and 4B are diagrams to show examples of a case of receiving an SSB and a PDSCH according to a second aspect.

FIG. 4A shows an example of a case where an SSB and a PDSCH are transmitted from the same cell. When the SSB and the PDSCH (for example, associated with a TCI state) are transmitted from the same cell, at least one (for example, all) of Condition 2-1-1 to Condition 2-1-4 below may be applied. The same cell may mean between a serving cell and a serving cell or a between a non-serving cell and a non-serving cell.

<Condition 2-1-1>

The UE may not expect to receive a DMRS for PDSCH in a resource element (RE) overlapping the resource element of an SSB. Condition 2-1-1 may be interpreted that the UE may expect not to receive a DMRS for PDSCH in a resource element (RE) overlapping the resource element of an SSB.

<Condition 2-1-2>

The UE may expect that the same subcarrier spacing or different subcarrier spacings are configured for a DMRS and an SSB of a CC (or a cell) except for a given case (for example 240 kHz) where only different subcarrier spacings are supported.

<Condition 2-1-3>

The UE may assume that, for a certain PDSCH scheduled with an SI-RNTI, an SSB is not transmitted in a resource element used for reception of the PDSCH.

<Condition 2-1-4>

For a certain PDSCH, when resource allocation to the PDSCH overlaps the PRB including the transmission resource of an SSB, the UE may assume that the PRB including the transmission resource of the SSB is not used for the PDSCH in the OFDM symbol in which the SSB is transmitted.

In Condition 2-1-4, the PDSCH may be applied to a PDSCH scheduled by a PDCCH CRC-scrambled with a C-RNTI, an MCS-C-RNTI, or a CS-RNTI, or a PDSCH to which SPS is applied.

In Condition 2-1-4, it may be configured that, when the UE receives a PDSCH scheduled with an SI-RNTI (system information indicator of DCI is configured at 1), an RA-RNTI, an MSGB-RNTI, a P-RNTI, or a TC-RNTI, the UE assumes SSB transmission according to a given higher layer parameter (for example, ssb-PositionsInBurst).

Figure 4B:
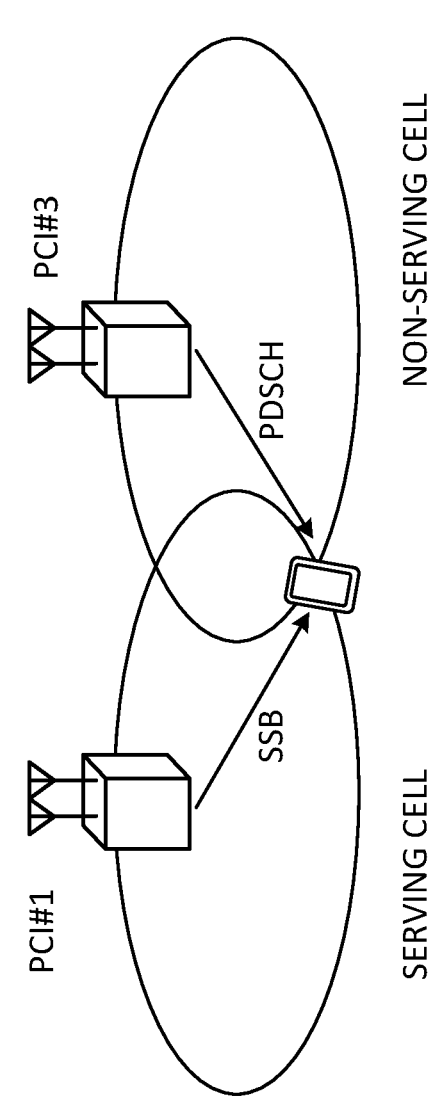

FIG. 4B shows an example of a case where an SSB and a PDSCH are transmitted from different cells. Here, shown is a case where the SSB is transmitted from a serving cell and the PDSCH is transmitted from a non-serving cell. However, an SSB may be transmitted from the non-serving cell, and a PDSCH may be transmitted from the serving cell.

It may be configured that none of Condition 2-1-1 to Condition 2-1-4 above is applied to an SSB and a PDSCH (associated with a TCI state) transmitted from different cells (for example, one is from a serving cell and the other is from a non-serving cell), or a specific case.

Alternatively, at least one (or a plurality or all) of Condition 2-1-1 to Condition 2-1-4 above may be applied to an SSB and a PDSCH (associated with a TCI state) transmitted from different cells (for example, one is from a serving cell and the other is from a non-serving cell), or a specific case.

The specific case may be, for example, a case where the SSB is transmitted from the serving cell and the PDSCH is transmitted from the non-serving cell or a case where the SSB is transmitted from the non-serving cell and the PDSCH is transmitted from the serving cell.

<Case 2-2>

Assume a case where a control resource set (CORESET) pool index is configured for a CORESET in multi-DCI based MTRP.

Figure 5A:
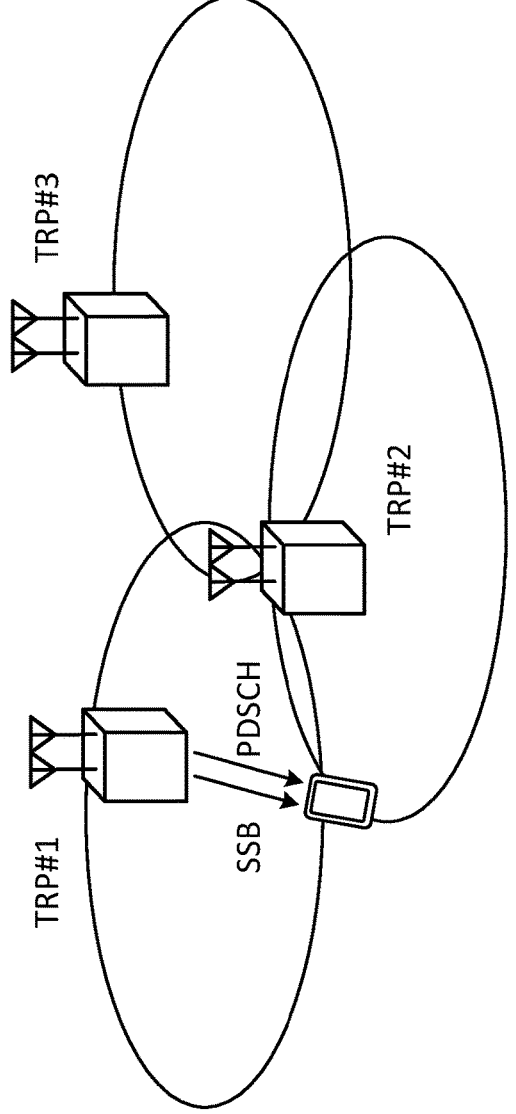
FIGS. 5A and 5B are diagrams to show other examples of the case of receiving an SSB and a PDSCH according to the second aspect.

FIG. 5A shows an example of a case where an SSB and a PDSCH are associated with the same CORESET pool index (for example, transmitted from the same TRP). Here, shown is a case where the SSB and the CSI-RS are transmitted from TRP #1.

For an SSB and a PDSCH (associated with a TCI state) associated with a certain CORESET pool index (for example, the same CORESET pool index), the UE may apply the conditions/restrictions described in <SSB vs. PDSCH> described above.

Figure 5B:
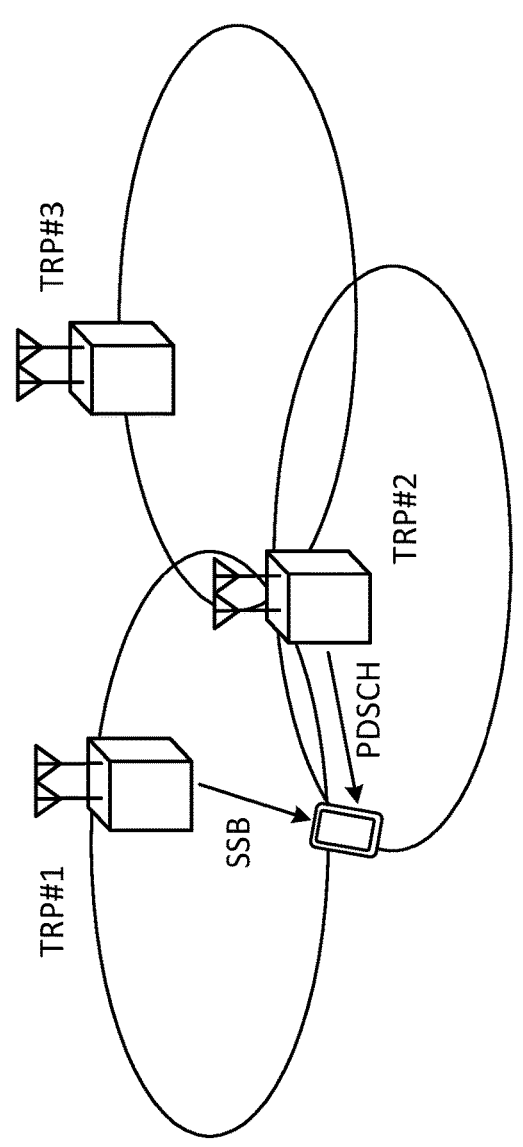

FIG. 5B shows an example of a case where an SSB and a PDSCH are associated with different CORESET pool indices (for example, transmitted from different TRPs). Here, shown is a case where the SSB is transmitted from TRP #1 (for example, corresponding to CORESET pool index 0), and the PDSCH is transmitted from TRP #2 (for example, corresponding to CORESET pool index 1).

It may be configured that none of Condition 2-1-1 to Condition 2-1-4 above is applied to an SSB and a PDSCH (associated with a TCI state) corresponding to different CORESET pool indices, or a specific case.

Alternatively, at least one (or a plurality or all) of Condition 2-1-1 to Condition 2-1-4 above may be applied to an SSB and a PDSCH (associated with a TCI state) corresponding to different CORESET pool indices, or a specific case.

The specific case may be, for example, a case where the SSB is associated with CORESET pool index 0 and the PDSCH is associated with CORESET pool index 1 or a case where the SSB is associated with CORESET pool index 1 and the PDSCH is associated with CORESET pool index 0.

<Case 2-3>

In single-DCI based MTRP, the UE may apply at least one of Alt. 2-3-1 and Alt. 2-3-2 below.

<<Alt. 2-3-1>>

In single-DCI based MTRP, a new group index for a CORESET or a new group index for a channel measurement resource (CMR) configuration in a CSI framework may be supported.

The new group index may indicate a relationship between a plurality of reference signals/channels and indicate whether rate matching (or collision handling) between the plurality of reference signals/channels is applicable.

For example, for an SSB and a PDSCH (associated with a TCI state) associated with the same group index, the UE may apply the conditions/restrictions described in <SSB vs. PDSCH> described above.

It may be configured that none of Condition 2-1-1 to Condition 2-1-4 above is applied to an SSB and a PDSCH (associated with a TCI state) associated with different group indices, or a specific case.

Alternatively, at least one (or a plurality or all) of Condition 2-1-1 to Condition 2-1-4 above may be applied to an SSB and a PDSCH (associated with a TCI state) associated with different group indices, or a specific case.

The specific case may be, for example, a case where the SSB is associated with group index 0 and the PDSCH is associated with group index 1 or a case where the SSB is associated with group index 1 and the PDSCH is associated with group index 0.

<<Alt. 2-3-2>>

Assume a case where two TCI states are applied to one PDSCH. For example, two TIC states may be configured for/applied to one PDSCH, based on activation of a TCI state by a MAC CE (+TCI state indication by DCI) or a default QCL rule.

When two TCI states (for example, TCI #1 and TCI #3) are activated for a certain codepoint of a TCI field in DCI for scheduling a PDSCH by a MAC CE, this may indicate that the two TCI states correspond to different TRPs. In this case, a case where an SSB and a PDSCH colliding in the time domain are transmitted from different TRPs (for example, a case where the SSB corresponds to TCI #1 and the PDSCH corresponds to TCI #3) is also assumed.

In this case, it may be configured that none of Condition 2-1-1 to Condition 2-1-4 above is applied to an SSB and a PDSCH associated with different TCI states, or a specific case.

Alternatively, at least one (or a plurality or all) of Condition 2-1-1 to Condition 2-1-4 above may be applied to an SSB and a PDSCH associated with different TCI states, or a specific case.

The specific case may be, for example, a case where the SSB is associated with a first TCI state and the PDSCH is associated with a second TCI state of the two TCI states.

As described in the second aspect, in a case where an SSB and a PDSCH are transmitted from different cells/TRPs, processing can be simplified when the same condition as an allocation condition (for example, rate matching processing)/a subcarrier spacing condition applied in a case where an SSB and a PDSCH are transmitted from the same cell is applied. Alternatively, in a case where an SSB and a PDSCH are transmitted from different cells/TRPs, transmission of the SSB and the PDSCH can be flexibly controlled by allowing application of a condition at least partially different from an allocation condition (for example, rate matching processing)/a subcarrier spacing condition applied in a case where an SSB and a PDSCH are transmitted from the same cell is applied.

(Third Aspect)

In a third aspect, control of transmission of a PDCCH and a channel state information reference signal (CSI-RS) will be described.

For example, collision handling for a PDCCH and a CSI-RS in the same time domain may be controlled based on a cell/TRP from which the PDCCH/CSI-RS is transmitted. Note that handling of resource collision between the PDCCH and the CSI-RS may be interpreted as rate matching.

UE operations in a case of inter-cell mobility including a non-serving cell (L1/L2 inter-cell mobility) (case 3-1), a multi-DCI based MTRP scenario (case 3-2), and single-DCI based MTRP scenario (case 3-3) will be described below. In the following description, a PDCCH and a CSI-RS overlapping in the same time domain (or at least part of the time domain) are assumed, but this is not restrictive.

<Case 3-1>

It may be allowed/supported that a TCI state is configured for a resource RS (for example, an SSB) from a non-serving cell (or a serving cell with a different PCI). In this case, it may be supported that association between the CSI-RS and the non-serving cell (or the PDCCH from the non-serving cell) is configured. The association between the CSI-RS and the non-serving cell (or the PDCCH from the non-serving cell) may be performed directly or may be performed indirectly (un-directly).

The association being performed directly may be, for example, that an indication (for example, a PCI or a PCI flag) of the serving cell or the non-serving cell is configured for the PDCCH/CSI-RS or the TCI state corresponding to the PDCCH/CSI-RS.

The association being performed indirectly may mean, for example, that the PDCCH/CSI-RS is associated with the serving cell when a QCL source RS (for example, a type D RS) of the TCI state for the PDCCH/CSI-RS is in the serving cell (or configured in the serving cell). In other cases, this may mean that the PDCCH/CSI-RS is associated with the non-serving cell.

Figures 6A, 6B:
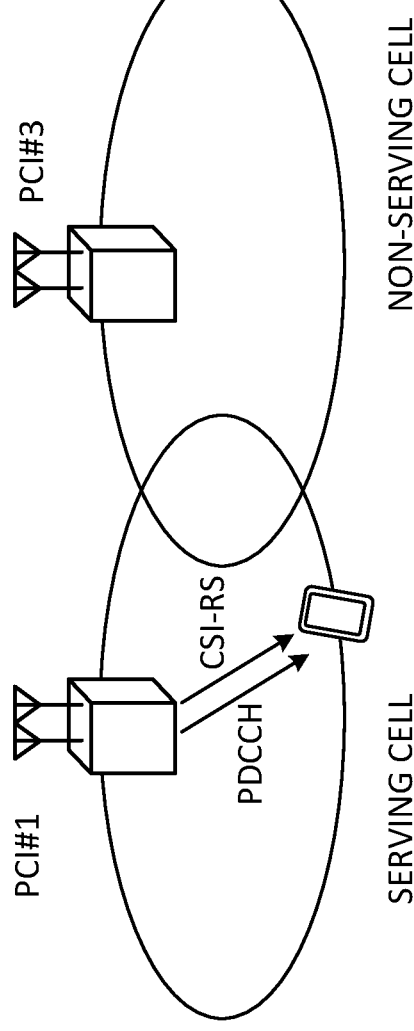
FIGS. 6A and 6B are diagrams to show examples of a case of receiving a PDCCH and a CSI-RS according to a third aspect.

FIG. 6A shows an example of a case where a CSI-RS and a PDCCH are transmitted from the same cell. When the CSI-RS and the PDCCH (for example, associated with a TCI state) are transmitted from the same cell, at least one (for example, all) of Condition 3-1-1 to Condition 3-1-2 below may be applied to the UE. The same cell may mean between a serving cell and a serving cell or a between a non-serving cell and a non-serving cell.

<Condition 3-1-1>

For a CSI-RS resource associated with a non-zero power CSI-RS (for example, NZP-CSI-RS-ResourceSet) with a given higher layer parameter (for example, 'repetition') being configured to be on, the UE may not expect that a CSI-RS is configured in a symbol while the UE is configured to monitor a CORESET (for example, a given symbol period). In other words, the UE may assume that a CSI-RS is not configured in a symbol while the UE is configured to monitor a CORESET.

<Condition 3-1-2>

The UE may not expect that the CSI-RS is configured in a PRB overlapping the PRB of a CORESET in an OFDM symbol occupied by a search space set. In other words, the UE may assume that the CSI-RS is not configured in a PRB overlapping the PRB of the CORESET in the OFDM symbol occupied by the search space set.

FIG. 6B shows an example of a case where a CSI-RS and a PDCCH are transmitted from different cells. Here, shown is a case where the PDCCH is transmitted from a serving cell and the CSI-RS is transmitted from a non-serving cell. However, a PDCCH may be transmitted from the non-serving cell, and a CSI-RS may be transmitted from the serving cell.

It may be configured that neither Condition 3-1-1 nor Condition 3-1-2 above is applied to a CSI-RS and a PDCCH (associated with a TCI state) transmitted from different cells (for example, one is from a serving cell and the other is from a non-serving cell), or a specific case.

Alternatively, at least one (or either/both) of Condition 3-1-1 and Condition 3-1-2 above may be applied to a CSI-RS and a PDCCH (associated with a TCI state) transmitted from different cells (for example, one is from a serving cell and the other is from a non-serving cell), or a specific case.

The specific case may be, for example, a case where the CSI-RS is transmitted from the serving cell and the PDCCH is transmitted from the non-serving cell or a case where the CSI-RS is transmitted from the non-serving cell and the PDCCH is transmitted from the serving cell.

<Case 3-2>

When a control resource set (CORESET) pool index is configured for a CORESET in multi-DCI based MTRP, configuration of association between the CSI-RS and the CORESET pool index may be supported. The association between the CSI-RS and the CORESET pool index may be performed directly or may be performed indirectly (un-directly).

Figures 7A, 7B:
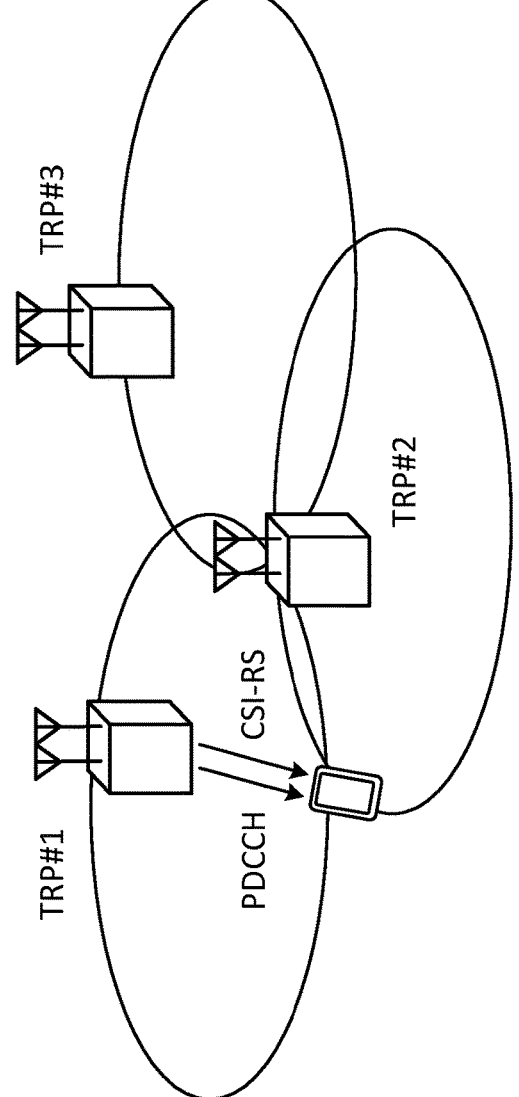
FIGS. 7A and 7B are diagrams to show other examples of the case of receiving a PDCCH and a CSI-RS according to the third aspect.

FIG. 7A shows an example of a case where a CSI-RS and a PDCCH are associated with the same CORESET pool index (for example, transmitted from the same TRP). Here, shown is a case where the CSI-RS and the PDCCH are transmitted from TRP #1.

For a CSI-RS and a PDCCH (associated with a TCI state) associated with a certain CORESET pool index (for example, the same CORESET pool index), the UE may apply the conditions/restrictions described in <PDCCH vs. CSI-RS> described above.

FIG. 7B shows an example of a case where a CSI-RS and a PDCCH are associated with different CORESET pool indices (for example, transmitted from different TRPs). Here, shown is a case where the PDCCH is transmitted from TRP #1 (for example, corresponding to CORESET pool index 0), and the CSI-RS is transmitted from TRP #2 (for example, corresponding to CORESET pool index 1).

It may be configured that none of Condition 3-1-1 to Condition 3-1-2 above is applied to a CSI-RS and a PDCCH (associated with a TCI state) corresponding to different CORESET pool indices, or a specific case.

Alternatively, at least one (or either/both) of Condition 3-1-1 and Condition 3-1-2 above may be applied to a CSI-RS and a PDCCH (associated with a TCI state) corresponding to different CORESET pool indices, or a specific case.

The specific case may be, for example, a case where the CSI-RS is associated with CORESET pool index 0 and the PDCCH is associated with CORESET pool index 1 or a case where the CSI-RS is associated with CORESET pool index 1 and the PDCCH is associated with CORESET pool index 0.

<Case 3-3>

In single-DCI based MTRP, the UE may apply at least one of Alt. 3-3-1 and Alt. 3-3-2 below.

<<Alt. 3-3-1>>

In single-DCI based MTRP, a new group index for a CORESET or a new group index for a channel measurement resource (CMR) configuration in a CSI framework may be supported. In this case, a configuration of association between a CSI-RS and the new group index may be supported. The association between the CSI-RS and the new group index may be performed directly or may be performed indirectly (un-directly).

The new group index may indicate a relationship between a plurality of reference signals/channels and indicate whether rate matching (or collision handling) between the plurality of reference signals/channels is applicable.

For example, for a CSI-RS and a PDCCH associated with the same group index, the UE may apply the conditions/restrictions described in <PDCCH vs. CSI-RS> described above.

It may be configured that neither Condition 3-1-1 nor Condition 3-1-2 above is applied to a CSI-RS and a PDCCH associated with different group indices, or a specific case.

Alternatively, at least one (or either/both) of Condition 3-1-1 and Condition 3-1-2 above may be applied to a CSI-RS and a PDCCH associated with different group indices, or a specific case or a specific case.

The specific case may be, for example, a case where the CSI-RS is associated with group index 0 and the PDCCH is associated with group index 1 or a case where the CSI-RS is associated with group index 1 and the PDCCH is associated with group index 0.

<<Alt. 3-3-2>>

Assume a case where two TCI states are applied to one PDSCH. For example, two TIC states may be configured for/applied to one PDSCH, based on activation of a TCI state by a MAC CE (+TCI state indication by DCI) or a default QCL rule.

When two TCI states (for example, TCI #1 and TCI #3) are activated for a certain codepoint of a TCI field in DCI for scheduling a PDSCH by a MAC CE, this may indicate that the two TCI states correspond to different TRPs. In this case, a case where a CSI-RS and a PDCCH colliding in the time domain are transmitted from different TRPs (for example, a case where the CSI-RS corresponds to TCI #1 and the PDCCH corresponds to TCI #3) is also assumed.

In this case, it may be configured that neither Condition 3-1-1 nor Condition 3-1-2 above is applied to a CSI-RS and a PDCCH associated with different TCI states, or a specific case.

Alternatively, at least one (or either/both) of Condition 3-1-1 and Condition 3-1-2 above may be applied to a CSI-RS and a PDCCH associated with different TCI states, or a specific case.

The specific case may be, for example, a case where the CSI-RS is associated with a first TCI state and the PDCCH is associated with a second TCI state of the two TCI states.

As described in the third aspect, in a case where a CSI-RS and a PDCCH are transmitted from different cells/TRPs, processing can be simplified when the same condition as an allocation condition (for example, rate matching processing)/a subcarrier spacing condition applied in a case where a CSI-RS and a PDCCH are transmitted from the same cell is applied. Alternatively, in a case where a CSI-RS and a PDCCH are transmitted from different cells/TRPs, transmission of the CSI-RS and the PDCCH can be flexibly controlled by allowing application of a condition at least partially different from an allocation condition (for example, rate matching processing)/a subcarrier spacing condition applied in a case where a CSI-RS and a PDCCH are transmitted from the same cell is applied.

(Fourth Aspect)

In a fourth aspect, control of transmission of an SSB and a PDCCH will be described.

For example, collision handling for a PDCCH and a CSI-RS in the same time domain may be controlled based on a cell/TRP from which the PDCCH/CSI-RS is transmitted. Note that handling of resource collision between the PDCCH and the CSI-RS may be interpreted as rate matching.

A case where an SSB and a PDCCH are transmitted from the same cell (see FIG. 8A) or a case where an SSB and a PDCCH are transmitted from the same TRP (for example, multi-DCI based MTRP/single-DCI based MTRP) (see FIG. 9A) is assumed. FIG. 9A shows an example of a case where an SSB and a PDCCH are associated with the same CORESET pool index (for example, transmitted from the same TRP).

When an SSB and a PDCCH are transmitted from the same cell/TRP, the UE may assume that a PRB/resource element including the transmission resource of the SSB is not used for the PDCCH/DMRS for the PDCCH (Condition 4-1).

When an SSB and a PDCCH are transmitted from different cells (see FIG. 8B), when an SSB and a PDCCH are transmitted from different TRPs (see FIG. 9B), or in a specific case, Condition 4-1 above may be applied to the SSB and the PDCCH.

Figures 8A, 8B:
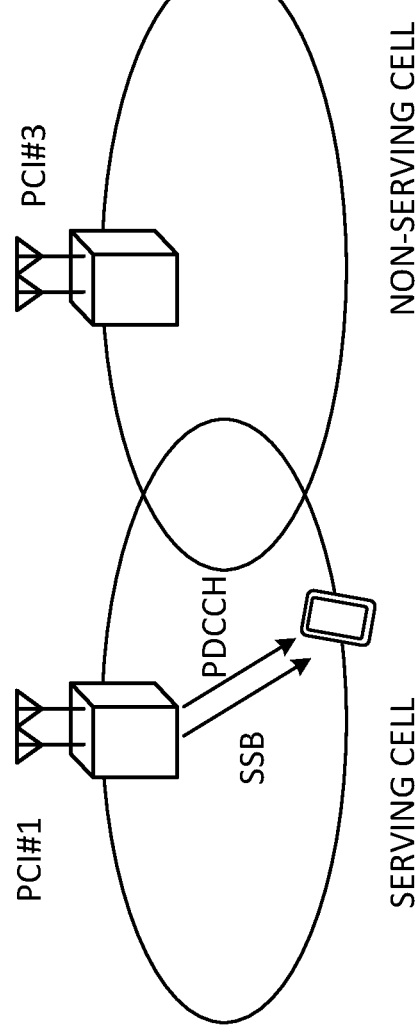
FIGS. 8A and 8B are diagrams to show examples of a case of receiving an SSB and a PDCCH according to a fourth aspect.
Figure 9A:
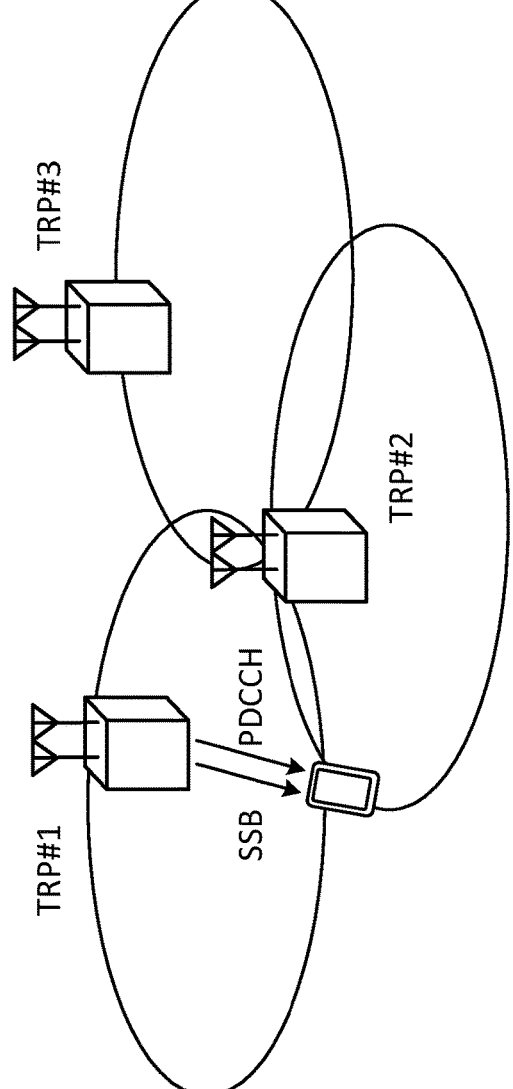
FIGS. 9A and 9B are diagrams to show other examples of the case of receiving an SSB and a PDCCH according to the fourth aspect.
Figure 9B:
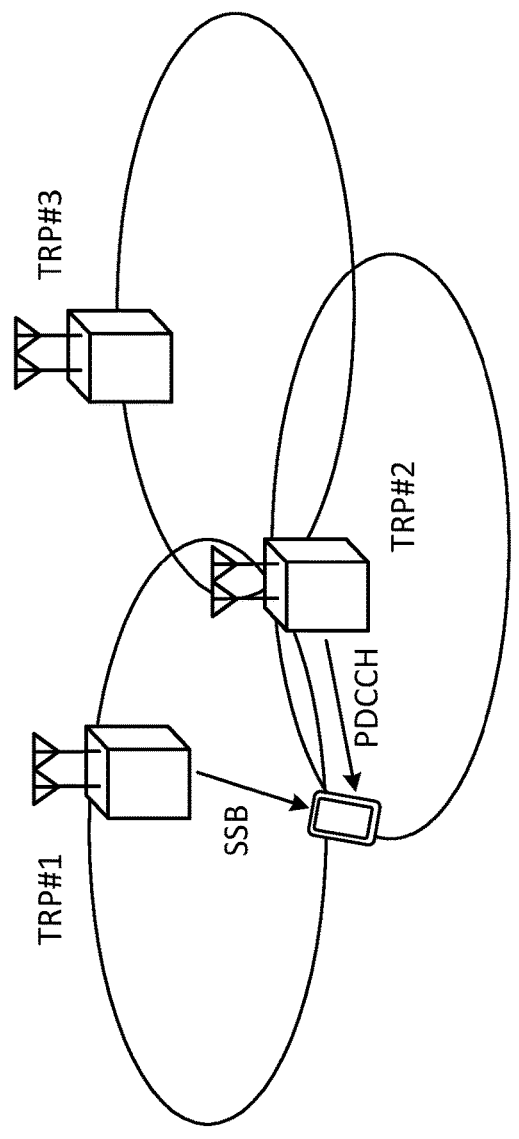

FIG. 8B shows a case where the SSB is transmitted from a serving cell and the PDCCH is transmitted from a non-serving cell. However, an SSB may be transmitted from the non-serving cell, and a PDCCH may be transmitted from the serving cell. FIG. 9B shows an example of a case where an SSB and a PDCCH are associated with different CORESET pool indices (for example, transmitted from different TRPs).

Alternatively, it may be configured that, when an SSB and a PDCCH are transmitted from different cells, when an SSB and a PDCCH are transmitted from different TRPs, or in a specific case, Condition 4-1 above is not applied to the SSB and the PDCCH.

The specific case may be, for example, a case where the SSB is transmitted from a first cell/first TRP and the PDCCH is transmitted from a second cell/second TRP, or a case where the SSB is transmitted from the second cell/second TRP and the PDCCH is transmitted from the first cell/first TRP.

The UE may apply Condition 4-1 above in at least one of Case 4-1 to Case 4-5 below in monitoring of a PDCCH candidate (for example, a PDCCH candidate). Alternatively, the UE may perform such control as not to apply Condition 4-1 above in at least one of Case 4-1 to Case 4-5 below in monitoring of a PDCCH candidate (for example, a PDCCH candidate).

{Case 4-1}

When Condition 4-1-1 to Condition 4-1-3 below are satisfied in monitoring of a PDCCH candidate, the UE may not be required to monitor the PDCCH candidate (or does not need to monitor the PDCCH).

When the UE receives a given parameter (for example, ssb-PositionsInBurst) included in SIB1 and does not receive a higher layer parameter for a serving cell (for example, ssb-PositionsInBurst in ServingCellConfig-Common) (Condition 4-1-1).

The UE does not monitor a PDCCH candidate in a given common search space set (for example, Type0-PDCCH CSS set) (Condition 4-1-2).

At least one resource element for the PDCCH candidate overlaps at least one resource element for an SSB candidate corresponding to an SSB index provided by a given parameter (for example, ssb-PositionsInBurst) included in SIB1 (Condition 4-1-3).

For example, in Condition 4-1-1 to Condition 4-1-3 above, when an SSB and a PDCCH are transmitted from different cells/different TRPs to the UE, the UE may assume that a PRB/resource element including the transmission resource of the SSB is not used for the PDCCH/DMRS for the PDCCH.

Alternatively, in Condition 4-1-1 to Condition 4-1-3 above, when an SSB and a PDCCH are transmitted from different cells/different TRPs, it may be allowed for the UE that a PRB/resource element including the transmission resource of the SSB is used for the PDCCH/DMRS for the PDCCH.

{Case 4-2}

When Condition 4-2-1 to Condition 4-2-3 below are satisfied in monitoring of a PDCCH candidate, the UE may not be required to monitor the PDCCH candidate (or does not need to monitor the PDCCH).

When the UE receives a higher layer parameter for a serving cell (for example, ssb-PositionsInBurst in Serv-ingCellConfigCommon) (Condition 4-2-1).

The UE does not monitor a PDCCH candidate in a given common search space set (for example, Type0-PDCCH CSS set) (Condition 4-2-2).

At least one resource element for the PDCCH candidate overlaps at least one resource element for an SSB candidate corresponding to an SSB index provided by ssb-PositionsInBurst in ServingCellConfigCommon (Condition 4-1-3).

For example, in Condition 4-2-1 to Condition 4-2-3 above, when an SSB and a PDCCH are transmitted from different cells/different TRPs to the UE, the UE may assume that a PRB/resource element including the transmission resource of the SSB is not used for the PDCCH/DMRS for the PDCCH.

Alternatively, in Condition 4-2-1 to Condition 4-2-3 above, when an SSB and a PDCCH are transmitted from different cells/different TRPs, it may be allowed for the UE that a PRB/resource element including the transmission resource of the SSB is used for the PDCCH/DMRS for the PDCCH.

{Case 4-3}

When the UE monitors a PDCCH candidate in a given common search space set (for example, Type0-PDCCH CSS set) of a serving cell according to a given procedure, the UE may assume that an SSB is not transmitted in a resource element used for the monitoring of the PDCCH candidate of the serving cell.

For example, when an SSB and a PDCCH are transmitted from different cells/different TRPs, the UE may assume that a PRB/resource element including the transmission resource of the SSB is not used for the PDCCH/DMRS for the PDCCH.

Alternatively, when an SSB and a PDCCH are transmitted from different cells/different TRPs, it may be allowed that a PRB/resource element including the transmission resource of the SSB is used for the PDCCH/DMRS for the PDCCH.

In particular, in Case 4-3, the given common search space set (for example, Type0-PDCCH CSS set) can be limited to only the serving cell. Hence, it may be configured that transmission of an SSB from a non-serving cell is allowed in a resource element used for the monitoring of the PDCCH candidate of the given common search space set of the serving cell.

{Case 4-4}

When at least one resource element of the PDCCH candidate of the serving cell overlaps a given resource element, the UE may not be required to monitor the PDCCH candidate (or does not need to monitor the PDCCH candidate). The given resource element may be at least one resource element corresponding to lte-CRS-ToMatchAround or at least one resource element corresponding to LTE-CRS-PatternList. lte-CRS-ToMatchAround may be a higher layer parameter for determining an LTE CRS pattern for which the UE is to perform rate matching. LTE-CRS-PatternList may be a higher layer parameter related to an LTE CRS pattern.

For example, when an SSB and a PDCCH are transmitted from different cells/different TRPs, the UE may assume that a PRB/resource element including the transmission resource of the SSB is not used for the PDCCH/DMRS for the PDCCH.

Alternatively, when an SSB and a PDCCH are transmitted from different cells/different TRPs, it may be allowed that a PRB/resource element including the transmission resource of the SSB is used for the PDCCH/DMRS for the PDCCH.

In Case 4-4, it may be configured that, when a higher priority is given to lte-CRS-ToMatchAround/LTE-CRS-PatternList and any PDCCH need be avoided overlapping an LTE CRS, both PDCCHs transmitted from the serving cell and the non-serving cell follow the restriction in Case 4-4 above.

Alternatively, it may be configured that, when a CORE-SET pool index is configured (for example, multi-DCI based MTRP), crs-RateMatch-PerCORESETPoolIndex is enabled, and both Lte-CRS-PatternList1-r16 and lte-CRS-PatternList2-r16 are configured, a PDCCH of each cell follows the restriction of each LTE CRS pattern list. When the PDCCH and the LTE CRS pattern correspond to different cells, the restriction may not be followed.

{Case 4-5}

When a higher layer parameter related to a resource block set per cell (for example, availableRB-SetsPerCell) is provided, the UE may not be required to monitor a PDCCH candidate overlapping any RB of an RB set indicated by a given field (for example, available RB set indicator field) included in a given DCI format (for example, DCI format 2_0) that reception is impossible (or does not need to monitor the PDCCH candidate). When the UE does not acquire an RB set indicator available for a symbol, PDCCH candidates of all the RB sets in the symbol may be monitored.

For example, when an SSB and a PDCCH are transmitted from different cells/different TRPS, the UE may assume that a PRB/resource element including the transmission resource of the SSB is not used for the PDCCH/DMRS for the PDCCH.

Alternatively, when an SSB and a PDCCH are transmitted from different cells/different TRPS, it may be allowed that a PRB/resource element including the transmission resource of the SSB is used for the PDCCH/DMRS for the PDCCH.

In Case 4-5, it may be configured that a higher layer parameter related to a resource block set per cell (for example, availableRB-SetsPerCell) is used for performing only an indication per serving cell (Option 5-1). In other words, no indicator may be provided to the non-serving cell. In this case, the restriction of Case 4-5 above may be applied to PDCCHs from both the serving cell and the non-serving cell. Alternatively, the restriction of Case 4-5 above may be applied only to a PDCCH from the serving cell.

Alternatively, in Case 4-5, availableRB-SetsPerCell may be indicated to both the serving cell and the non-serving cell (Option 5-2). In this case, it may be configured that a PDCCH transmitted from each cell follows a restriction indicated to the cell.

Alternatively, in Case 4-5, availableRB-SetsPerCell may be used for performing an indication per serving cell, and indication may be given to the non-serving cell by a given higher layer parameter (for example, availableRB-SetsPerCellForNonServingCell) (Option 5-3). In this case, it may be configured that a PDCCH transmitted from each cell follows a restriction indicated for the cell (or a restriction corresponding to the cell).

In this case, a single higher layer parameter (for example, availableRB-SetsPerCellForNonServingCell) may be configurable for a plurality of (for example, all) non-serving cells. Alternatively, a plurality of higher layer parameters (for example, availableRB-SetsPerCellForNonServingCell) may be configured for the respective non-serving cells.

As described in the fourth aspect, in a case where an SSB and a PDCCH are transmitted from different cells/TRPs, processing can be simplified when the same condition as an allocation condition (for example, rate matching processing)/a subcarrier spacing condition applied in a case where an SSB and a PDCCH are transmitted from the same cell is applied. Alternatively, in a case where an SSB and a PDCCH are transmitted from different cells/TRPs, transmission of the SSB and the PDCCH can be flexibly controlled by allowing application of a condition at least partially different from an allocation condition (for example, rate matching processing)/a subcarrier spacing condition applied in a case where an SSB and a PDCCH are transmitted from the same cell is applied.

(UE Capability Information)

In the first to fourth aspects, the following UE capabilities may be configured. Note that the following UE capabilities may be interchangeably interpreted as parameters (for example, higher layer parameters) configured for the UE by a network (for example, a base station).

UE capability information may be defined related to whether the UE applies/supports rate matching enhancement to/for at least one of L1/L2 inter-cell mobility (for example, a non-serving cell), multi-DCI based MTRP, and single-DCI based MTRP in one or a plurality of cases.

Rate matching enhancement may have at least one configuration (for example, resource allocation/subcarrier spacing) of the first aspect (SSB and CSI-RS), the second aspect (SSB and PDSCH), the third aspect (PDCCH and CSI-RS), and the fourth aspect (SSB and PDCCH) above.

UE capability information regarding whether rate matching enhancement is performed on reference signals/channels/signals from different cells/TRPs may be defined.

UE capability information regarding whether rate matching enhancement is supported for reference signals/channels/signals from different cells/TRPs in a specific case may be defined. The specific case may be, for example, a case where a signal (for example, an SSB) from a first cell/first TRP and another signal (for example, a reference signal/channel different from an SSB) is transmitted from a second cell/second TRP.

The first to fourth aspects may be configured to be applied to a UE supporting/reporting at least one of the UE capabilities described above. Alternatively, the first to fourth aspects may be configured to be applied to a UE configured by a network.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
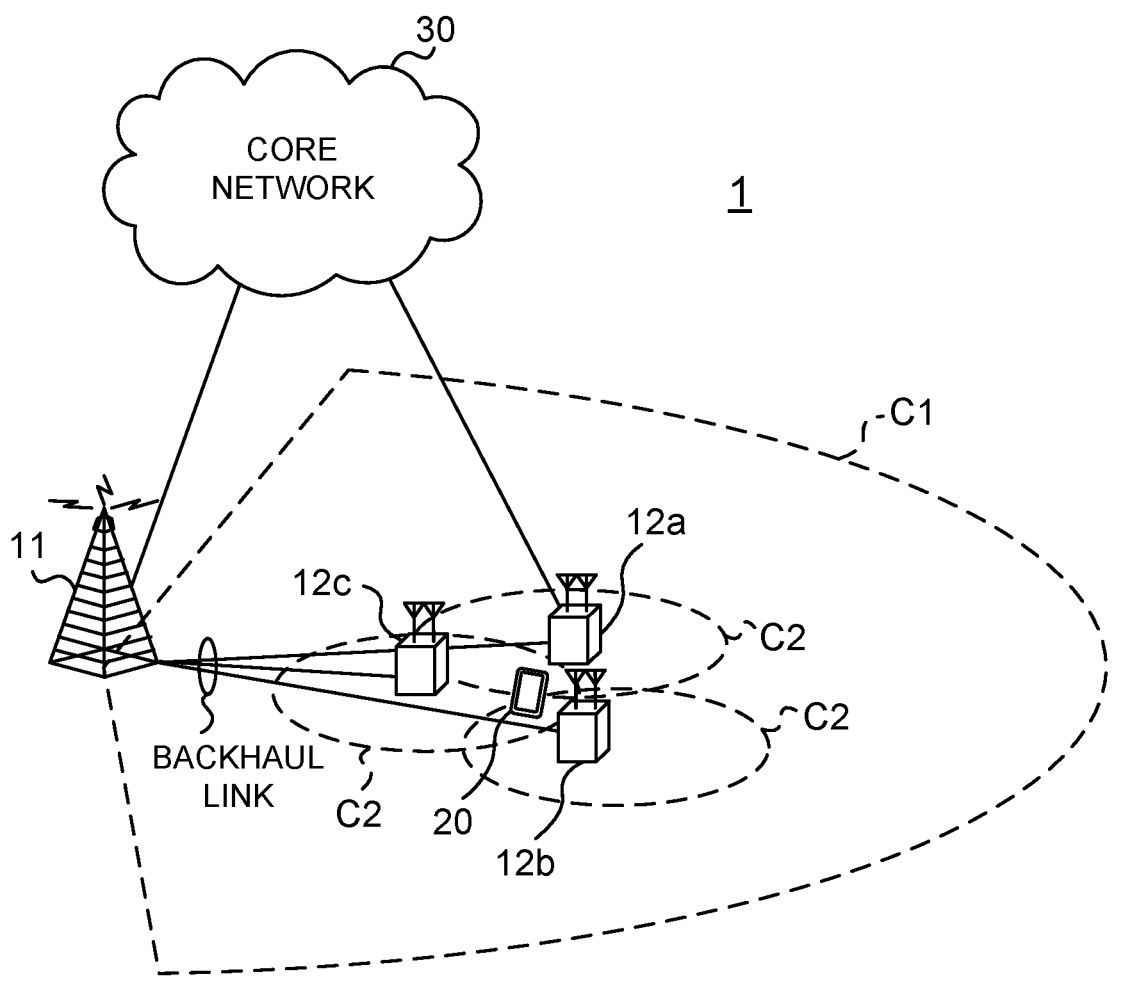
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
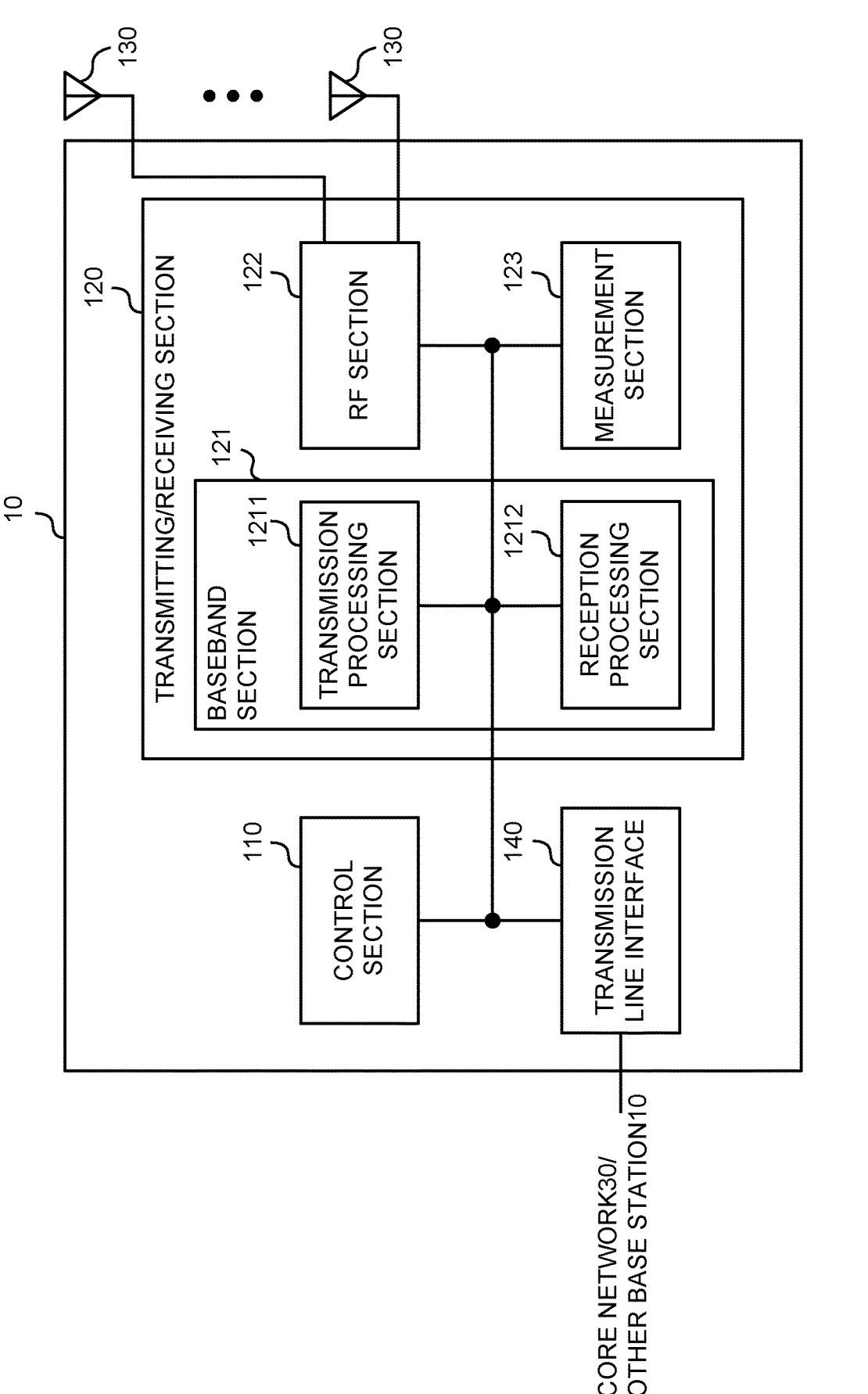
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit information regarding association of at least one of a channel state information reference signal and a synchronization signal block with at least one of a cell index, a control resource set pool index, and a group index configured for a control resource set. The control section 110 may control at least one of allocation of the channel state information reference signal and the synchronization signal block in the time domain and subcarrier spacing to apply to each of the channel state information reference signal and the synchronization signal block.

The transmitting/receiving section 120 may transmit at least one of the synchronization signal block and the downlink shared channel. The control section 110 may control allocation of at least one of a downlink shared channel and a reference signal for the downlink shared channel, according to at least one of a cell index, a control resource set pool index, and a group index configured for a control resource set to which each of the synchronization signal block and the downlink shared channel corresponds.

The transmitting/receiving section 120 may transmit information regarding association of at least one of a channel state information reference signal and a downlink control channel associated with at least one of a cell index, a control resource set pool index, and a group index configured for a control resource set. The control section 110 may control at least one of allocation of the channel state information reference signal and the downlink control channel in the time domain and subcarrier spacing to apply to each of the channel state information reference signal and the downlink control channel.

(User Terminal)

Figure 12:
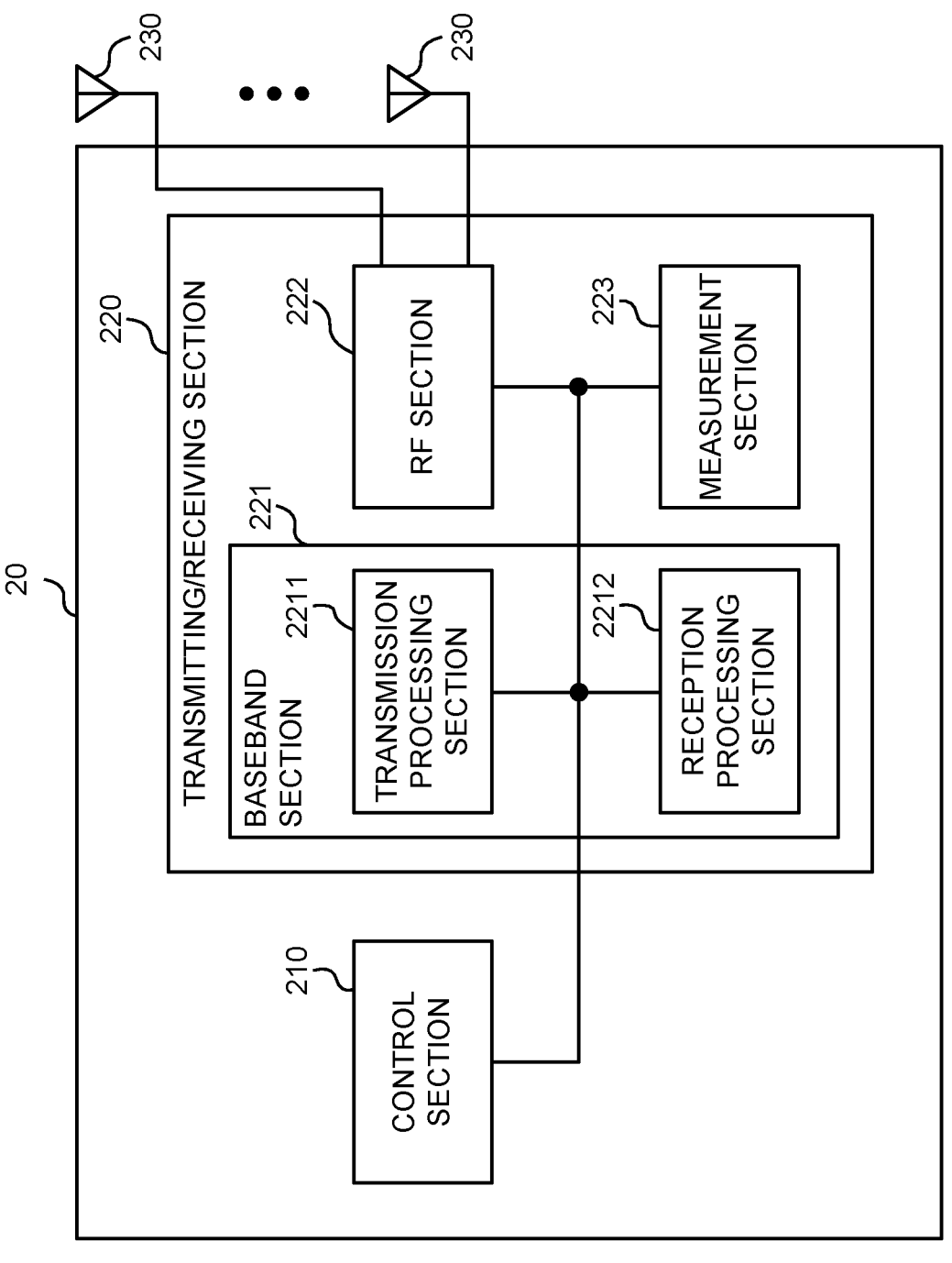
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information regarding association of at least one of a channel state information reference signal and a synchronization signal block with at least one of a cell index, a control resource set pool index, and a group index configured for a control resource set. The control section 210 may judge, based on the information, at least one of allocation of the channel state information reference signal and the synchronization signal block in the time domain and subcarrier spacing to be applied to each of the channel state information reference signal and the synchronization signal block.

A condition different from at least one of an allocation condition and a subcarrier spacing condition applied to a channel state information reference signal and a synchronization signal block transmitted from the same cell may be applied to a channel state information reference signal and a synchronization signal block transmitted from different cells.

A condition different from at least one of an allocation condition and a subcarrier spacing condition applied to a channel state information reference signal and a synchronization signal block corresponding to the same control resource set pool index may be applied to a channel state information reference signal and a synchronization signal block corresponding to different control resource pool indices.

A condition different from at least one of an allocation condition and a subcarrier spacing condition applied to a channel state information reference signal and a synchronization signal block corresponding to the same group index may be applied to a channel state information reference signal and a synchronization signal block corresponding to different group indices.

The transmitting/receiving section 220 may receive at least one of the synchronization signal block and the downlink shared channel. The control section 210 may judge allocation of a downlink shared channel or a reference signal for the downlink shared channel, based on at least one of a cell index, a control resource set pool index, and a group index configured for a control resource set to which each of the synchronization signal block and the downlink shared channel corresponds.

A condition different from at least one of an allocation condition and a subcarrier spacing condition applied to a synchronization signal block and a downlink shared channel transmitted from the same cell may be applied to a synchronization signal block and a downlink shared channel transmitted from different cells.

A condition different from at least one of an allocation condition and a subcarrier spacing condition applied to a synchronization signal block and a downlink shared channel corresponding to the same control resource set pool index may be applied to a synchronization signal block and a downlink shared channel corresponding to different control resource pool indices.

A condition different from at least one of an allocation condition and a subcarrier spacing condition applied to a synchronization signal block and a downlink shared channel corresponding to the same group index may be applied to a synchronization signal block and a downlink shared channel corresponding to different group indices.

The transmitting/receiving section 220 may receive information regarding association of at least one of a channel state information reference signal and a downlink control channel associated with at least one of a cell index, a control resource set pool index, and a group index configured for a control resource set. The control section 210 may judge, based on the information, at least one of allocation of the channel state information reference signal and the downlink control channel in the time domain and subcarrier spacing to be applied to each of the channel state information reference signal and the downlink control channel.

A condition different from at least one of an allocation condition and a subcarrier spacing condition applied to a channel state information reference signal and a downlink control channel transmitted from the same cell may be applied to a channel state information reference signal and a downlink control channel transmitted from different cells.

A condition different from at least one of an allocation condition and a subcarrier spacing condition applied to a channel state information reference signal and a downlink control channel corresponding to the same control resource set pool index may be applied to a channel state information reference signal and a downlink control channel corresponding to different control resource pool indices.

A condition different from at least one of an allocation condition and a subcarrier spacing condition applied to a channel state information reference signal and a downlink control channel corresponding to the same group index may be applied to a channel state information reference signal and a downlink control channel corresponding to different group indices.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
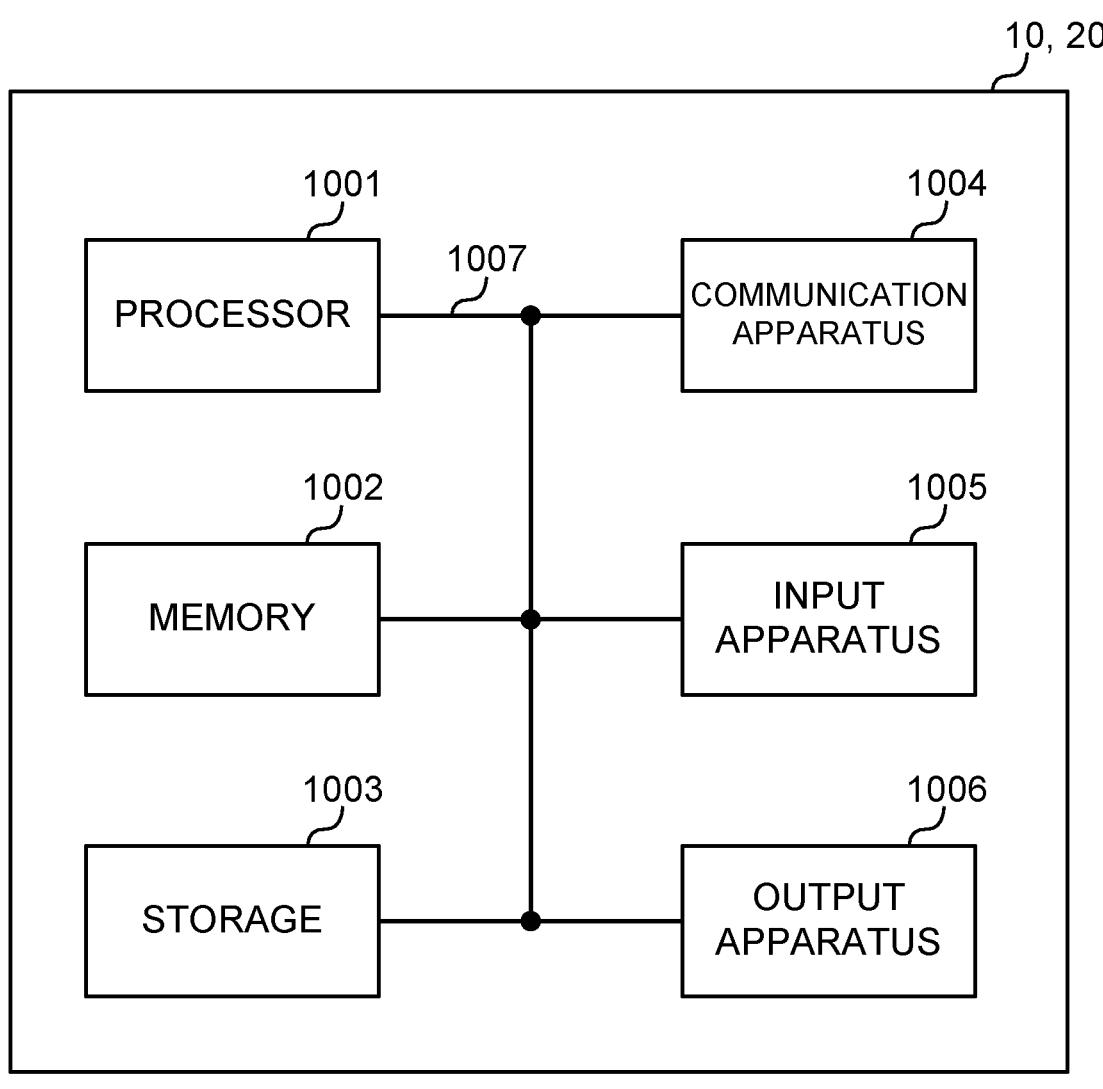
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements.

These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a processor that determines an allocation of a demodulation reference signal (DM-RS) for a physical downlink shared channel (PDSCH) based on physical cell IDs to which a synchronization signal/physical broadcast channel (SS/PBCH) block and the PDSCH correspond; and
   a receiver that receives at least one of the SS/PBCH block and the DM-RS for the PDSCH,
   wherein if the SS/PBCH block and the PDSCH are transmitted from a same cell, the processor does not expect to receive the DM-RS for the PDSCH in a resource element that overlaps with a resource element for the SS/PBCH block, and
   wherein if the SS/PBCH block and the PDSCH are transmitted from different cells, the PDSCH is associated with a transmission configuration indication (TCI) state.

2. The terminal according to claim 1, wherein a different allocation condition is applied to the SS/PBCH block and the PDSCH transmitted from the different cells than an allocation condition applied to the SS/PBCH block and the PDSCH transmitted from the same cell.

3. A radio communication method for a terminal, comprising:
   determining an allocation of a demodulation reference signal (DM-RS) for a physical downlink shared channel (PDSCH) based on physical cell IDs to which a synchronization signal/physical broadcast channel (SS/PBCH) block and the PDSCH correspond; and
   receiving at least one of the SS/PBCH block and the DM-RS for the PDSCH,
   wherein if the SS/PBCH block and the PDSCH are transmitted from a same cell, the DM-RS for the PDSCH is not expected to be received in a resource element that overlaps with a resource element for the SS/PBCH block, and
   wherein if the SS/PBCH block and the PDSCH are transmitted from different cells, the PDSCH is associated with a transmission configuration indication (TCI) state.

4. A system comprising:
   a terminal; and
   a base station;
   wherein the terminal comprises:
   a processor that determines an allocation of a demodulation reference signal (DM-RS) for a physical downlink shared channel (PDSCH) based on physical cell IDs to which a synchronization signal/physical broadcast channel (SS/PBCH) block and the PDSCH correspond; and
   a receiver that receives at least one of the SS/PBCH block and the DM-RS for the PDSCH,
   wherein if the SS/PBCH block and the PDSCH are transmitted from a same cell, the processor does not expect to receive the DM-RS for the PDSCH in a resource element that overlaps with a resource element for the SS/PBCH block, and wherein if the SS/PBCH block and the PDSCH are transmitted from different cells, the PDSCH is associated with a transmission configuration indication (TCI) state, and the base station comprises:

a transmitter that transmits at least one of the SS/PBCH block and the DM-RS for the PDSCH.

\* \* \* \* \*